US012738629B2

(12) United States Patent
Sauder et al.

(10) Patent No.: US 12,738,629 B2
(45) Date of Patent: Sep. 15, 2026

(54) KINEMATIC HINGE WITH ASYMMETRIC PIN HOLE

(71) Applicant: California Institute of Technology, Pasadena, CA (US)

(72) Inventors: Jonathan Sauder, La Crescenta, CA (US); Maya C Roman, Pasadena, CA (US); Christine A Gebara, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 98 days.

(21) Appl. No.: 19/043,362

(22) Filed: Jan. 31, 2025

(65) Prior Publication Data

US 2025/0253518 A1 Aug. 7, 2025

Related U.S. Application Data

(60) Provisional application No. 63/550,974, filed on Feb. 7, 2024.

(51) Int. Cl.
*H01Q 1/12* (2006.01)
*F16C 11/04* (2006.01)

(52) U.S. Cl.
CPC ......... *H01Q 1/1235* (2013.01); *F16C 11/045* (2013.01)

(58) Field of Classification Search
CPC ............................... H01Q 1/12; H01Q 1/1235
See application file for complete search history.

(56) References Cited

U.S. PATENT DOCUMENTS 4,654,671 A * 3/1987 Baghdasarian ...... H01Q 15/162 343/915
5,479,678 A 1/1996 Reed et al.
(Continued)

FOREIGN PATENT DOCUMENTS

| | | | | |
|---|---|---|---|---|
| JP | 2587197 B2 * | 3/1997 | ............. | H01Q 15/20 |
| JP | 2003200899 A * | 7/2003 | ............... | B64G 1/22 |
| JP | 2006264445 A * | 10/2006 | ............... | B64G 1/22 |

OTHER PUBLICATIONS

Sauder, J. et al. "Starburst: a Revolutionary Under-Constrained Adaptable Deployable Structure Architecture: NIAC Final Report." Mar. 30, 2024. Jet Propulsion Laboratory. Copyright 2024 California Institute of Technology. 59 pages.
(Continued)

*Primary Examiner* — Hoang V Nguyen
(74) *Attorney, Agent, or Firm* — Steinfl + Bruno LLP

(57) ABSTRACT

A kinematic hinge with asymmetric pin hole is described. The pin hole includes two separated flat surfaces arranged at a relative angle to form a V-shape. The flat surfaces provide respective two kinematic contact points with a surface of a hinge pin arranged within the pin hole. A centerline of the V-shape is in a plane that is parallel to a plane of a hinge leaf associated with the asymmetric pin hole. A centerline of the V-shape is in a plane that intersects the plane of associated hinge leaf. The pin hole includes a teardrop shape provided by two arc segments joined by tangent line segments. Further included is a split V-block having two distant flat surfaces and corresponding rounded surfaces. The asymmetric pin hole is implemented in one or both hinge leaves of the kinematic hinge. The hinge pin is rigidly attached to one of the two hinge leaves.

23 Claims, 16 Drawing Sheets

(56) References Cited

U.S. PATENT DOCUMENTS

| | | | | |
|---|---|---|---|---|
| 5,533,234 | A * | 7/1996 | Bizek | E05F 1/123 49/386 |
| 10,276,926 | B2 | 4/2019 | Cwik et al. | |
| 2014/0173852 | A1* | 6/2014 | Heninger | E05D 5/14 16/375 |
| 2019/0214737 | A1* | 7/2019 | Dominocielo | H01Q 15/161 |

OTHER PUBLICATIONS

Sauder, Jonathan et al. "Design of a Novel Eccentric Kinematic Hinge: A Lesson in Nesting Forces", Jet Propulsion Laboratory, California University of Technology. Sep. 2023. Poster.

Sauder, Jonathan et al. "Design of a Novel Eccentric Kinematic Hinge", California University of Technology. Sep. 2023. 4 pages.

Agnes, G.S. et al. "Testing the Deployment Repeatability of a Precision Deployable Boom Prototype for the Proposed SWOT KaRIn Instrument", (Jan. 5-9, 2015), 2nd AIAA Spacecraft Structures Conference, Kissimmee, Florida. 12 pages.

Chahat, N., Arya, M., Sauder, J., Thiel, E., Zhou, M., and Cwik, T. One Meter Reflectarray Antenna: OMERA. In CubeSat Antenna Design, John Wiley & Sons, Ltd, 2020, pp. 139-162.

Champagne, J. et al. "Deployable Mirror for Enhanced Imagery Suitable for Small Satellite Applications." Small Satellite Conference, 2013. 9 pages.

Gentemann, C. L., Clayson, C. A., Brown, S., Lee, T., Parfitt, R., Farrar, J. T., Bourassa, M., Minnett, P. J., Seo, H., Gille, S. T., and Zlotnicki, V. "FluxSat: Measuring the Ocean-Atmosphere Turbulent Exchange of Heat and Moisture from Space." Remote Sensing, vol. 12, No. 11, (Jun. 3, 2020), p. 1796. https://doi.org/10.3390/rs12111796.

Haddad, Z. S., Peral, E., Tanelli, S., Sy, O., and Stephens, G. RaInCube: A Proposed Constellation of Atmospheric Profiling Radars in Cubesat. In Remote Sensing of the Atmosphere, Clouds, and Precipitation VI, Proc. of SPIE, vol. 9876, (2016), pp. 987606. 8 pages.

Hale, L. C., and Slocum, A. H. "Optimal Design Techniques for Kinematic Couplings." Precision Engineering, vol. 25, No. 2, (2001), pp. 114-127. https://doi.org/10.1016/S0141-6359(00)00066-0.

Sauder, J. F., Arya, M., Chahat, N., Thiel, E., Dunphy, S., Shi, M., Agnes, G., and Cwik, T. Deployment Mechanisms for High Packing Efficiency One-Meter Reflectarray Antenna (OMERA). In AIAA Scitech 2019 Forum, American Institute of Aeronautics and Astronautics, (Jan. 7-11, 2019).

Stephens, G., Winker, D., Pelon, J., Trepte, C., Vane, D., Yuhas, C., L'Ecuyer, T., and Lebsock, M. "CloudSat and CALIPSO within the A-Train: Ten Years of Actively Observing the Earth System." Bulletin of the American Meteorological Society, vol. 99, No. 3, (Mar. 2018), pp. 569-581. https://doi.org/10.1175/BAMS-D-16-0324.1.

Thriving on Our Changing Planet: A Decadal Strategy for Earth Observation from Space. The National Academies Press, Washington, DC, (2018). 700 pages.

Villalba, V. et al. "Review on Thermal and Mechanical Challenges in the Development of Deployable Space Optics", Journal of Astronomical Telescopes, Instruments, and Systems, vol. 6, No. 1, (2020), p. 010902, 31 pages. https://doi.org/10.1117/1.JATIS.6.1.010902.

* cited by examiner

100

KINEMATIC HINGE WITH ASYMMETRIC PIN HOLE

CROSS REFERENCE TO RELATED APPLICATIONS

The present application claims priority to and the benefit of U.S. provisional patent application Ser. No. 63/550,974 entitled "High Precision Kinematic Hinge Utilizing an Eccentric Tear Drop Hole", filed on Feb. 7, 2024, the disclosure of which is incorporated herein by reference in its entirety.

STATEMENT OF GOVERNMENT GRANT

This invention was made with government support under Grant No. 80NMO0018D0004 awarded by NASA (JPL). The government has certain rights in the invention.

TECHNICAL FIELD

The present disclosure relates to methods and structures for a kinematic hinge capable of providing high precision and repeatable deployment. More particularly, it relates to a kinematic hinge having points of contact provided by pin holes with asymmetric shape.

BACKGROUND

When structures deploy in space via hinges, it is often desired to have high accuracy and repeatability in the deployed structures position. This is especially relevant, for example, in deployment of (e.g., single-or multi-panel) antennas where repeatability and accuracy requirements in deployment increase as antennas frequencies of operation increase. For example, at frequencies of operation above 100 GHz, corresponding structures (e.gg., panels) of the antennas may need to deploy with an angular repeatability of tens of arc seconds and an absolute position of tens of microns in order to provide consistent operation of the antennas. Although accuracy requirements in the deployment may substantially decrease at lower frequencies operation, such as for example, at about 32 GHz, precise hinges are desired for a consistent operation of the antennas.

Higher precision hinges may provide advantages in operation of structures other than antennas, and used in applications that may span across different fields, including for example, military, aerospace and/or commercial, and technologies related to, for example, telescopes, thermal covers/radiators, solar panels, doors, and/or positioning devices.

Current high precision hinges may use kinematic mounts/couplings in combination with hinge pins that remain loose with respect to corresponding hinge pin holes, even in the fully deployed state of the hinge. The hinge pins provide rough accuracy during deployment of a structure, but are removed from a load path when the structure is fully deployed and therefore do not participate in provision of the kinematic mounts/couplings. Accordingly, all loads exerted on the deployed hinge go through kinematic interfaces provided by the kinematic mounts/couplings. Problems associated with such high precision hinges include increased complexity in design and implementation, increased mass, and inability or difficulty to scale down to smaller hinge sizes, all such problems mainly stemming from requirement to maintain a separation in functionality between the hinge pins and the kinematic mounts/couplings.

It follows that teachings according to the present disclosure describe methods and structures for a high precision kinematic hinge that includes kinematic couplings provided by contact points between a hinge pin and hinge pin holes of the high precision kinematic hinge.

SUMMARY

According to one embodiment the present disclosure, a kinematic hinge is presented, comprising: a first hinge leaf comprising a pin hole; and a hinge pin arranged through the pin hole, wherein the pin hole includes two flat contact surfaces oppositely arranged at a relative angle to form a V-shape, during a non-deployed state of the kinematic hinge, the hinge pin is free to move in the pin hole, and during a deployed state of the kinematic hinge, the hinge pin is engaged with the two flat contact surfaces by way of two kinematic contact points formed between a round surface of the hinge pin and the two flat contact surfaces.

According to a second embodiment of the present disclosure, a precision deployment apparatus is presented, comprising: first and second leaves arranged for relative pivotal movement, each having a teardrop-shaped opening including: a first arc segment of a first radius; a second arc segment of a second radius smaller than the first radius; and linear segments connecting the first and second arc segments; and a pin extending through the teardrop-shaped openings, wherein in a deployed configuration, the pin contacts the linear segments of both leaves to establish exactly-constrained kinematic interfaces, and wherein in an undeployed configuration, the pin is free to move within enlarged portions of the openings provided by the first radius.

According to a third embodiment of the present disclosure, a method for realizing a kinematic hinge is presented, the method comprising: providing a first hinge leaf comprising two pin holes, each pin hole including two flat contact surfaces oppositely arranged at a relative angle to form a V-shape; arranging a hinge pin through the pin holes; arranging, on the first hinge leaf, a split V-block structure comprising two V-block flat contact surfaces respectively arranged proximal the two pin holes; based on the providing and the arranging of the hinge pin, obtaining in a deployed state of the kinematic hinge pin, respective first and second kinematic contact points provided through interaction of a round surface of the hinge pin with the two flat contact surfaces of a first one of the two pin holes; and respective third and fourth kinematic contact points provided through interaction of the round surface of the hinge pin with the two flat contact surfaces of a second one of the two pin holes; and based on the arranging of the split V-block structure on the first hinge leaf, obtaining in the deployed state of the kinematic hinge pin, respective fifth and sixth kinematic contact points provided through interaction of the two V-block flat contact surfaces with corresponding round surfaces provided by a second hinge leaf of the kinematic hinge.

Further aspects of the disclosure are shown in the specification, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

Like reference numbers and designations in the various drawings indicate like elements.

DETAILED DESCRIPTION

Figure 1A:
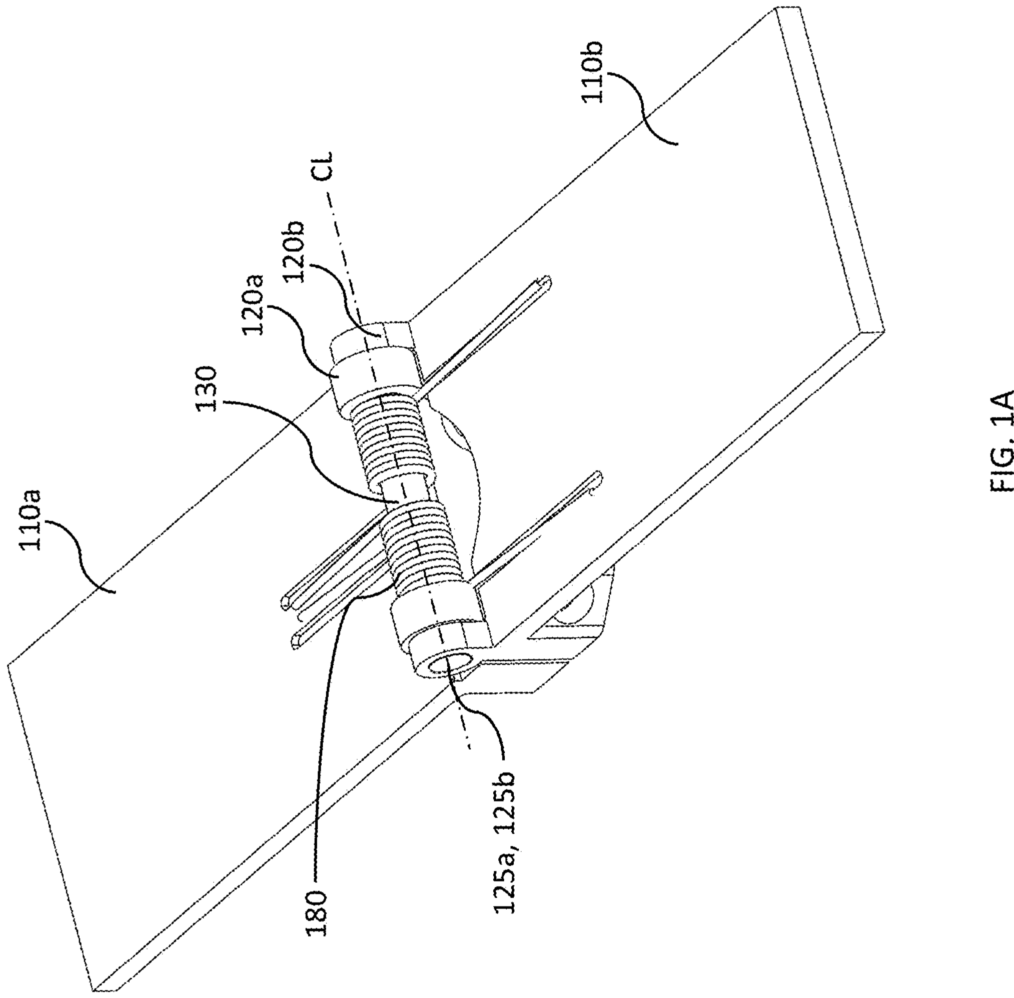
FIG. 1A shows a top perspective view of a kinematic hinge according to an embodiment of the present disclosure, including an asymmetric pin hole.

FIG. 1A shows a top perspective view of a kinematic hinge (100, e.g., shown in the deployed state) according to an embodiment of the present disclosure, including an asymmetric pin hole (e.g., 125*a,* 125*b*). As shown in FIG. 1A, the kinematic hinge (100) includes two hinge leaves (110*a,* 110*b*) having respective hinge knuckles (120*a,* 120*b,* two of each), wherein at least one of the hinge knuckles (120*a* and/or 120*b*) includes a respective asymmetric pin hole (e.g., 125*a* and/or 125*b*) having a shape provided by inner wall/contour of the hinge knuckles. The asymmetric pin holes (125*a,* 125*b*) provide respective openings for arrangement of a hinge pin (130) having a centerline (CL, e.g., center axis) along its longitudinal extension. Accordingly, the two hinge leaves (110*a,* 110*b*) are pivotally coupled through the hinge pin (130) for relative pivotal movement about the hinge pin (130). In some exemplary embodiments, a torsion spring (180) can be arranged about the hinge pin (130) for provision of a biasing force/torque.

According to an embodiment of the present disclosure, each of the hinge knuckles, (120*a*) and (120*b*), includes a respective asymmetric pin hole, (125*a*) and (125*b*). Accordingly, in such configuration, there may exist a state (e.g., not deployed, disengaged) of the kinematic hinge (100) where the hinge pin (130) may be free to move within the respective asymmetric pin holes, (125*a*) and (125*b*), and therefore the hinge pin (130) may not be fixed (e.g., rigidly coupled/attached, attached) to the two hinge leaves, (110*a*) and (110*b*).

In an alternate embodiment of the present disclosure, the hinge pin (130) may be rigidly fixed to one of the two hinge leaves, (110*a*) or (110*b*), and only the other of the two hinge leaves, (110*a*) or (110*b*), may include a hinge knuckle, (120*a*) or (120*b*), with the respective asymmetric pin hole, (125*a*) or (125*b*). In such embodiment, the hinge pin (130) may be attached to, for example, the respective hinge knuckle, (120*a*) or (120*b*), of the one of the two hinge leaves, (110*a*) or (110*b*), that may not (necessarily) include an asymmetric pin hole, (125*a*) or (125*b*).

Figure 1B:
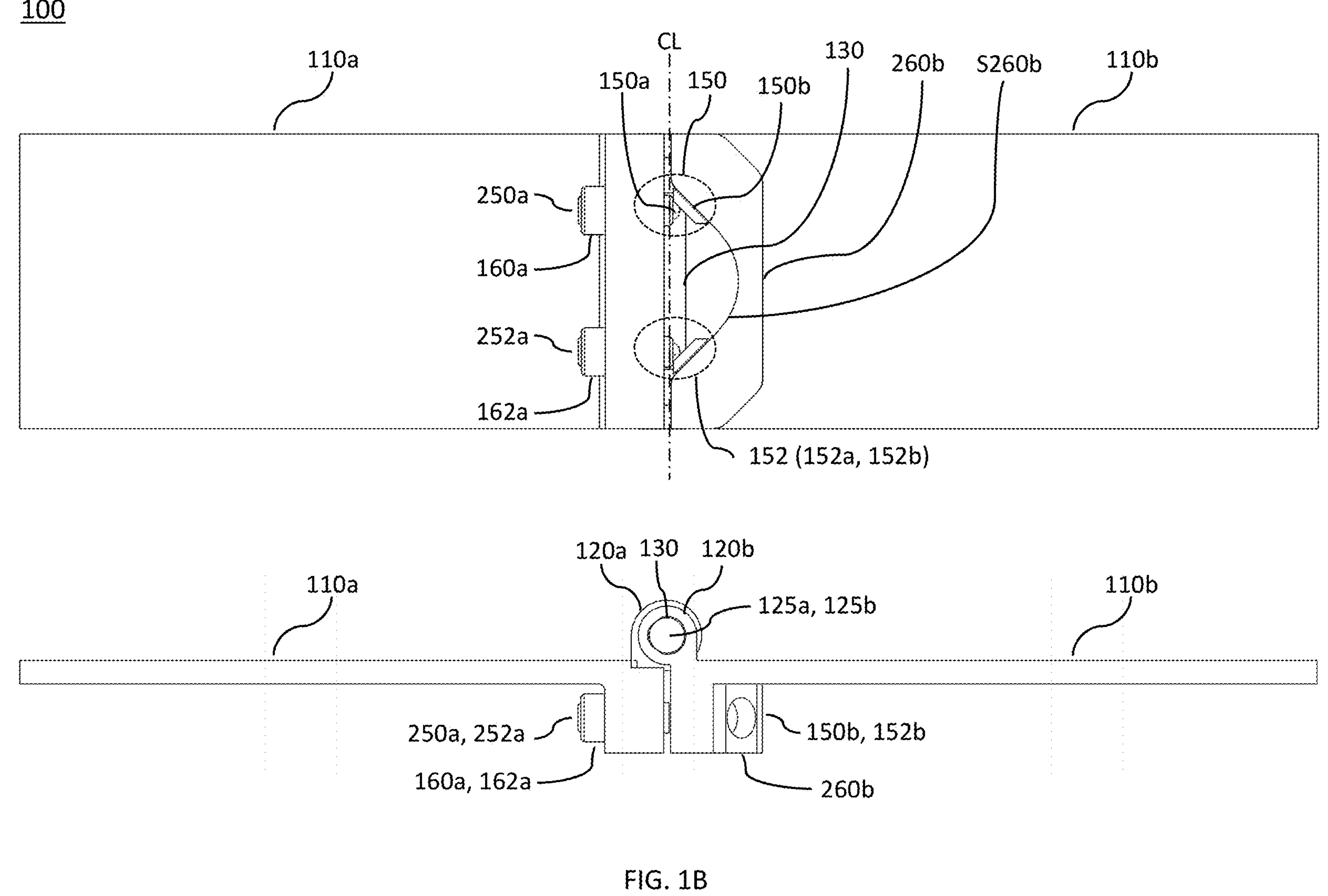
FIG. 1B shows a bottom view and a side view of the kinematic hinge of FIG. 1A.

FIG. 1B shows a bottom view (top region of FIG. 1B) and a side view (bottom region of FIG. 1B) of the kinematic hinge (100) of FIG. 1A. In particular, the bottom view shows features (150, 152, e.g., two contact points), each including a respective (angled) flat structure/block (e.g., 150*b,* having a flat surface) and a respective rounded structure/block (e.g., 150*a,* provided by a ball-tipped fine-pitch set screw 250*a* or 252*a*) for providing respective contact points (e.g., CP5 and CP6 of FIG. 2A later described) of the kinematic hinge (100). As shown in the bottom view of the kinematic hinge (100), the respective flat structure/block (e.g., 150*b*), is arranged at an angle (e.g., acute) with respect to the centerline, CL, of the hinge pin (130). In other words, a plane of the hinge pin (130) defined as a plane orthogonal (e.g., perpendicular, normal) to the centerline, CL, of the hinge pin (130), intersects a plane of (the flat surface of) the flat structure/block (e.g., 150*b*). In other words, a normal to (the flat surface of) the flat structure/block (e.g. 150) intersects the centerline, CL, of the hinge pin (130) at an angle. According to an embodiment of the present disclosure, such intersection is provided by an angle that is greater than zero degrees and smaller than ninety degrees (e.g., an acute angle). According to another embodiment of the present disclosure, such intersection is provided by an angle that is greater than ninety degrees and smaller than one hundred and eighty degrees (e.g., an obtuse angle). It is noted that respective angles provided by the flat structures/blocks (150) and (152), may be equal or different.

As shown in the bottom view (top region of FIG. 1B) and side view (bottom region of FIG. 1B), the kinematic hinge (100) includes elements (e.g., 160*a,* 162*a,* 260*b*) used to mount/support elements (e.g., 250*a,* 250*b,* 150*b,* 152*b*) that provide the features (150) and (152). In particular, elements (160*a,* 162*a*) may include threaded structures/channels for adjustable arrangement of the ball-tipped fine-pitch set screws (250*a,* 252*a*). On the other hand, the element (260*b*) may serve as a mounting structure/block having a V-shaped surface, S260*b,* for mounting of the flat structures/blocks (150*b,* 152*b*) and provision of a corresponding (e.g., acute) angle with respect to the centerline, CL, of the hinge pin (130). In some embodiments, the V-shaped surface, S260*b,* may provide a symmetrical arrangement of the flat structures/blocks (150*b,* 152*b*) about a plane orthogonal to the centerline, CL, of the hinge pin (130).

With continued reference to FIG. 1B and further reference to FIG. 1A, according to an embodiment of the present disclosure, the elements (160*a,* 162*a*) are rigidly fixed to a bottom side of the hinge leaf (110*a*) and the element (260*b*) is rigidly fixed to a bottom side of the hinge leaf (110*b*). In this context, respective bottom sides of the hinge leaves (110*a,* 110*b*) are opposite respective top sides of the hinge leaves (110*a,* 110*b*). Accordingly, and as shown in FIG. 1A and FIG. 1B, the hinge knuckles (120*a*) are rigidly fixed to the top side of the hinge leaf (110*a*), and the hinge knuckles (120*b*) are rigidly fixed to the top side of the hinge leaf (110*b*). It is noted that each of the hinge leaves, (110*a*) or (100*b*), may be described as including: a flat portion defined by a leaf length and a leaf width, the leaf length extending from an inwardly region near the centerline, CL, of the hinge pin (130) to an outwardly region away from the centerline, CL, of the hinge pin (130), and the leaf width extending from one end to the other end of a longitudinal extension of the hinge pin (130) along the centerline, CL, of the hinge pin (130); and respective bottom side and top side protrusions arranged in the inwardly region near the centerline, CL, of the hinge pin (130) that respectively correspond to the elements (160*a*, 162*a*, 260*b*) and (120*a*, 120*b*). It is further noted that such protrusions (e.g., any one or more of the elements 160*a*, 162*a*, 260*b*, 120*a* or 120*b*) may be formed by way of separate structures fixated to the hinge leaves (110*a*, 110*b*) and/or monolithic structures that are integral to the hinge leaves (110*a*, 110*b*).

Figure 2A:
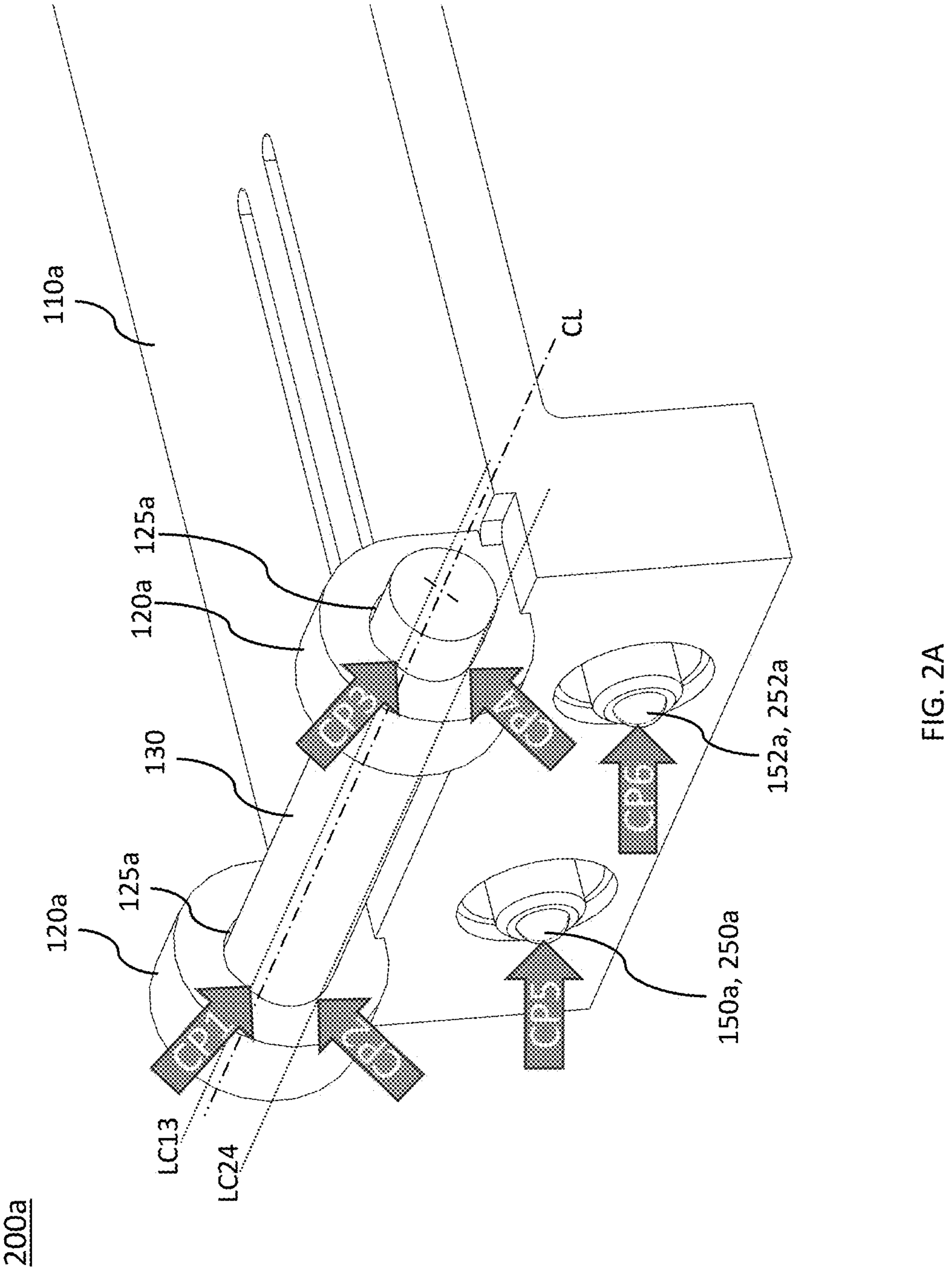
FIG. 2A shows points of contact of the kinematic hinge of FIG. 1A.

FIG. 2A shows six points of contact, CP1, CP2, CP3, CP4, CP5 and CP6 of the kinematic hinge (100) of FIG. 1A. As shown in FIG. 2A, the six points of contacts of the kinematic hinge (100) include points of contact CP1-CP4 provided through direct physical interaction between the hinge pin (130) and the hinge knuckles (120*a*), and points of contact CP5 and CP6 provided through direct physical interaction between the rounded tips (150*a*, 152*a*) of the ball-tipped fine-pitch set screws (250*a*, 252*a*) and the respective flat structures/blocks (e.g., 150*b*, 152*b* of FIG. 1B).

It is noted that by definition, a (three-dimensional) kinematic mount includes exactly six points of non-redundant kinematic contacts, referred herein as points of contact or contact points. The six points of non-redundant contacts may be considered as being provided by exactly-constrained kinematic interfaces. A kinematic mount having more than six points of contact is considered as being over-constrained, and potentially providing different (effective) points of contact at different deployments. On the other hand, a kinematic mount having less than six points of contact is considered as being under-constrained, and potentially result in non-repeatable positions of the contact points for different deployments.

It is noted that the six points of contact (e.g., CP1-CP6) shown in FIG. 2A may be considered as associated to the combination of the hinge leaf (110*a*) and the hinge pin (130), and configured to making such combination kinematic, or in other words, establishing a kinematic coupling that provides a repeatable and unique relative position (e.g., in the deployed state of the hinge) between the hinge leaf (110*a*) and the hinge pin (130). It is further noted that a combination of the hinge leaf (110*b*) and the hinge pin (130) may also include six contact points that make such combination kinematic, including contact points, CP5 and CP6, that are shared with the combination (110*a*, 130), and contact points (e.g., CP1', CP2', CP3', CP4' of FIG. 3C, later described) that are arranged (diametrically) opposite the contact points, CP1-CP4, with respect to the centerline, CL, of the hinge pin (130). Accordingly, the foregoing description with reference to the points of contact of the combination (110*a*, 130) may equally apply to the points of contact of the combination (110*b*, 130), mutatis mutandis. Accordingly, the hinge according to the present disclosure may be considered kinematic since it comprises two hinge leaves, each kinematically coupled to a hinge pin. It is noted, as described above in the present disclosure, teachings according to the present disclosure may equally apply to a configuration where the hinge pin (130) is rigidly fixed to one of the two hinge leaves, (110*a*) or (110*b*), and therefore, only the other of the two hinge leaves, (110*a*) or (110*b*), may be considered as including six (kinematic) points of contact (when considered in isolation).

As shown in FIG. 2A, and with further reference to FIG. 1B, because the contact interfaces for each of the points of contact, CP5 and CP6, is provided by a spherical surface (e.g., rounded tips 150*a*, 152*a*) and an opposing flat surface (e.g., 150*b*, 152*b*), then such contact interfaces result in a single point of contact. On the other hand, contact interfaces for each of the points of contact, CP1, CP2, CP3, and CP4, are provided through a cylindrical surface of the hinge pin (130) and opposing flat surfaces (e.g., TS1*a*, TS2*a* of FIG. 2B later described) provided by the asymmetric pin holes (125*a*, 125*b*) of the hinge knuckles (120*a*, 120*b*), and therefore, as later described with reference to FIG. 3A, such contact interfaces may be represented by lines of contact (e.g., LC13 and LC24) in the direction of the centerline, CL, that contain the contact points CP1-CP4.

Figure 2B:
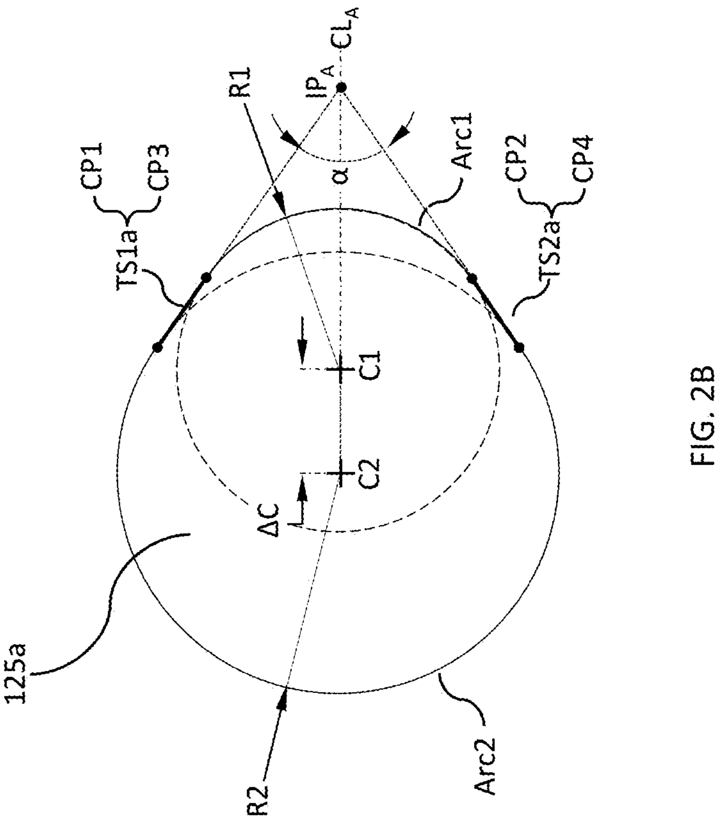
FIG. 2B shows details of contact interfaces provided by the asymmetric pin hole of the kinematic hinge.

FIG. 2B shows details of the contact interfaces (e.g., TS1*a* and TS2*a*) provided by an asymmetric pin hole (e.g., 125*a*, or 125*b* not shown in FIG. 2B) of the kinematic hinge (100). The asymmetric pin hole (125*a*, or 125*b* not shown in FIG. 2B) includes an asymmetric shape provided by a combination of two circles defined by respective radii, R2 and R1, and centers, C2 and C1, with R2 being greater than R1. In particular, the asymmetric pin hole (125*a*, or 125*b* not shown in FIG. 2B) may be provided by an arc segment, Arc2, of the larger circle (R2, C2), an arc segment, Arc1, of the smaller circle (R1, C1), and two (straight) line segments, TS1*a*, TS2*a*, that are tangent to, and connect, (ends of) the two arc segments, Arc1 and Arc2. It is noted that the asymmetric shape shown FIG. 2B represents a projected shape of the pin hole (125*a*) onto a plane orthogonal to the centerline, CL, of the hinge pin (130), and therefore, such shape may be maintained throughout an axial/longitudinal extension of the pin hole (125*a*) along the centerline, CL. Although not shown in FIG. 2B, it is noted that each asymmetric pin hole (125*b*) provided by the hinge knuckles (120*b*) may include a same shape as the asymmetric pin hole (125*a*) provided by the hinge knuckles (120*a*).

With continued reference to FIG. 2B, the two (straight) line segments, TS1*a*, TS2*a*, may provide (flat) contact surfaces for a direct physical interaction with the surface of the hinge pin (130), thereby defining (kinematic) points of contact of the kinematic hinge (100), or in other words, points of contact that are systematically and repeatedly reproduced through deployment of the kinematic hinge pin (100) when appropriate (nesting) force vectors (e.g., later described with reference to FIG. 3B) are applied onto the kinematic hinge (100). In particular, the line segments, TS1*a* and TS2*a*, of one of the two pin holes (125*a*) may participate in provision of a respective one of two different points of contact (e.g., CP1 or CP3), the and the line segments, TS1*a* and TS2*a*, of the other of the two pin holes (125*a*) may participate in provision of a respective one of two different points of contact (e.g., CP2 or CP4). On the other hand, the line segments (e.g., TS1*b* and TS2*b* as shown in FIG. 3C later described) of one of the two pin holes (e.g., 125*b*) may participate in provision of a respective one of two different points of contact (e.g., CP2 or CP4), the and the line segments, TS1*b* and TS2*b*, of the other of the two pin holes (125*b*) may participate in provision of a respective one of two different points of contact (e.g., CP1 or CP3).

As shown in FIG. 2B, the two (tangential) line segments, TS1*a* and TS2*a*, may intersect at an intersection point, $IP_A$, to form an intersect angle, α. In other words, a geometrical extension of the line segments, TS1a and TS2a, may intersect at the intersection point, $IP_A$, to form the intersect angle, α. According to an exemplary embodiment of the present disclosure, such geometrical extension may form a V-shape that is symmetrical with respect to a centerline, $CL_A$, of the pin hole (125a), with a tip (e.g., vertex) of the V-shape provided by the intersection point, $IP_A$. In other words, as shown in FIG. 2B, an angle between the line segment, TS1a, and the centerline, $CL_A$, and an angle between the line segment, TS2a, and the centerline, $CL_A$, may be equal to half the intersect angle, α. In other words, the line segments, TS1a and TS2a, may have slopes with respect to the centerline, $CL_A$, that are equal in magnitude and opposite in sign. As shown in FIG. 2B, the points, C1, C2 and $IP_A$, may be aligned and define the centerline, $CL_A$. Furthermore, a distance, ΔC, between the two centers, C1 and C2, may further define the (equal) length of the line segments, TS1a and TS2a. As later described in the present disclosure, the centerline (e.g., $CL_A$) may represent, or relate to, a plane that is parallel to the flat surface (e.g., a major surface) of the hinge leaf (e.g., 110a).

Figure 3A:
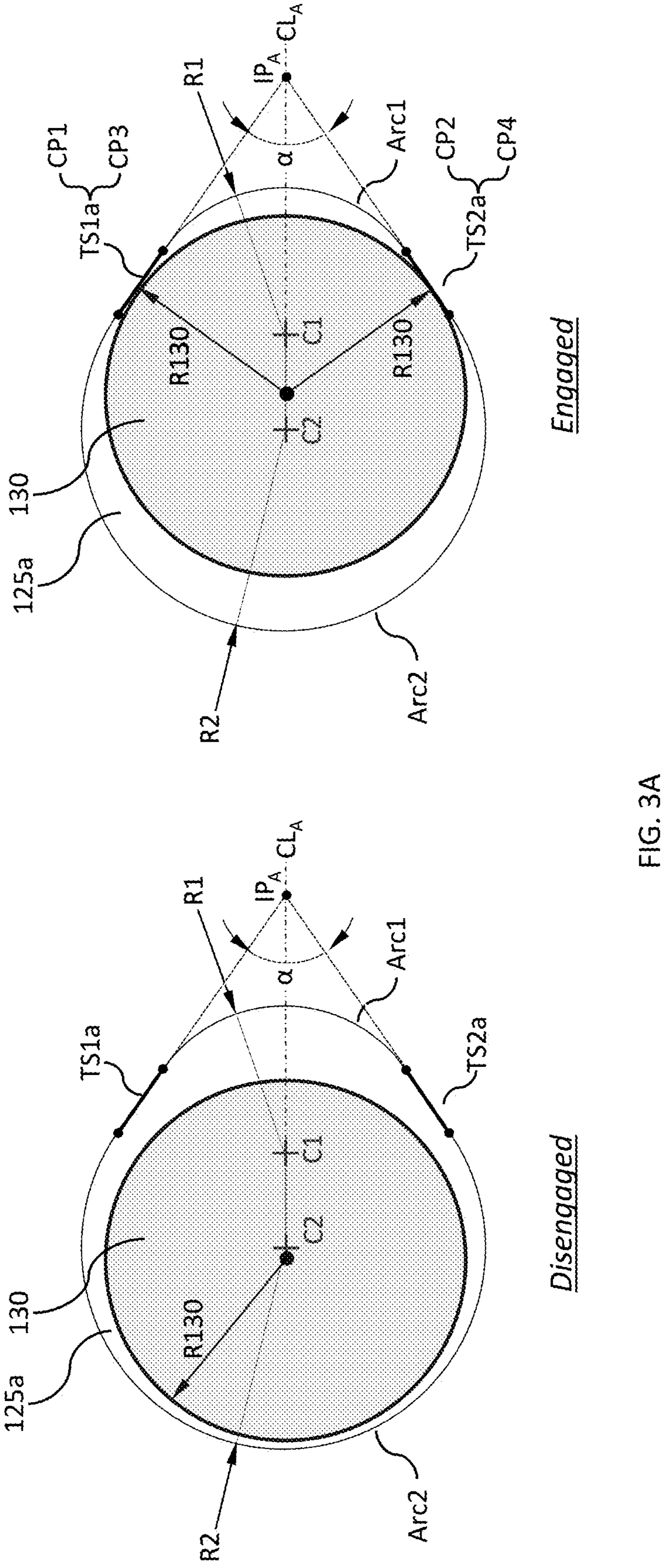
FIG. 3A shows disengaged and engaged configurations of a hinge pin arranged within the asymmetric pin hole of one hinge leaf of the kinematic hinge.

FIG. 3A shows disengaged (e.g., not deployed, non-deployed, undeployed) and engaged (e.g., deployed) configurations/states of the hinge pin (130) arranged within the asymmetric pin hole (125a) of one hinge leaf (e.g., 110a) of the kinematic hinge (100). In the configurations shown in FIG. 3A, the contact interfaces (e.g., TS1a and TS2a) are shown as being based on the tangents to arcs (e.g., Arc1 and Arc2) of the circles (R1, C1) and (R2, C2) described above with reference to FIG. 2B. It is noted that in FIG. 3A, the hinge pin is represented by a circle (with a center passing through the centerline, CL) having a radius, R130.

As shown in the disengaged configuration of FIG. 3A, the hinge pin (130) is free to move (e.g., floats) within a region of the asymmetric pin hole (125a) that accordingly can be defined as including a moving/floating space (e.g., volume, region) having a radius that is larger than a radius, R130, of the hinge pin (130). A condition to provide such moving space can be realized by a radius, R2, of the larger circle (R2, C2) that is greater than the radius, R130, of the hinge pin (130). Accordingly, in the disengaged state, the (centerline CL of the) hinge pin (130) may be located at a region of the asymmetric pin hole (125a) that is distal (away from) the intersection point, $IP_A$. Accordingly, in the disengaged state, the hinge pin (130) may not contact any one or both of the line segments, TS1a and TS2a.

As shown in the engaged configuration of FIG. 3A, the hinge pin (130) is constrained, and therefore not free to move further in a direction of the intersection point, $IP_A$. Such constraint in movement is due to a direct physical interaction of the hinge pin (130) with the contact surfaces provided by the line segments, TS1a and TS2a. A condition to provide such constraint in movement can be realized by a radius, R1, of the smaller circle (R1, C1) that is smaller than the radius, R130, of the hinge pin (130). Accordingly, in the engaged state, the (centerline CL of the) hinge pin (130) may be located at a region of the asymmetric pin hole (125a) that is proximal (near to) the intersection point, $IP_A$. Accordingly, and as shown in FIG. 3A, in the engaged state, the hinge pin (130) may contact the line segments, TS1a and TS2a, at respective contact points (e.g., CP1 and CP2, or CP3 and CP4) that are exactly at a distance equal to the radius, R130, from the centerline, CL, of the hinge pin (130). In other words, in the engaged state, the (straight) line segments, TS1a and TS2a, may be tangents to, or tangentially contact, the circular surface of the hinge pin (130), thereby defining single points of contacts (e.g., CP1 and CP2, or CP3 and CP4).

As previously noted, because the shapes shown in the figures of the present disclosure, including shapes shown in FIG. 3A, may be two-dimensional projections that can be maintained along (a third dimension provided by a direction of) the centerline, CL, of the hinge pin (130), then the straight line segments, TS1a and TS2a, may be considered as forming flat surfaces that make contact with the cylindrical surface of the hinge pin (130) along lines of contact, e.g., LC13 and LC24 of FIG. 2A, that extend in the direction of the centerline, CL. As shown in FIG. 2A, the line of contact, LC13, contains the contact points CP1 and CP3, and the line of contact, LC24, contains the contact points CP2 and CP4.

The intersect angle, α, of the V-shape provided by the two line segments (e.g., TS1a and TS2a) of the asymmetrical shape of the pin hole (e.g., 125a or 125b) according to the present disclosure, may be referred to as the V-angle. It is noted that a principle of operation of the kinematic hinge (e.g., 100) according to the present disclosure, may be based on presence of such V-shape and therefore corresponding V-angle. The V-angle may establish a condition for which a force vector exerted onto the hinge pin (130) may push the hinge pin (130) into engaging with the contact surfaces provided by the line segments (e.g., TS1a and TS2a). Various exemplary force vectors, F1, F2, F3, F4, exerted against the hinge pin (130), are shown in FIG. 3B.

Figure 3B:
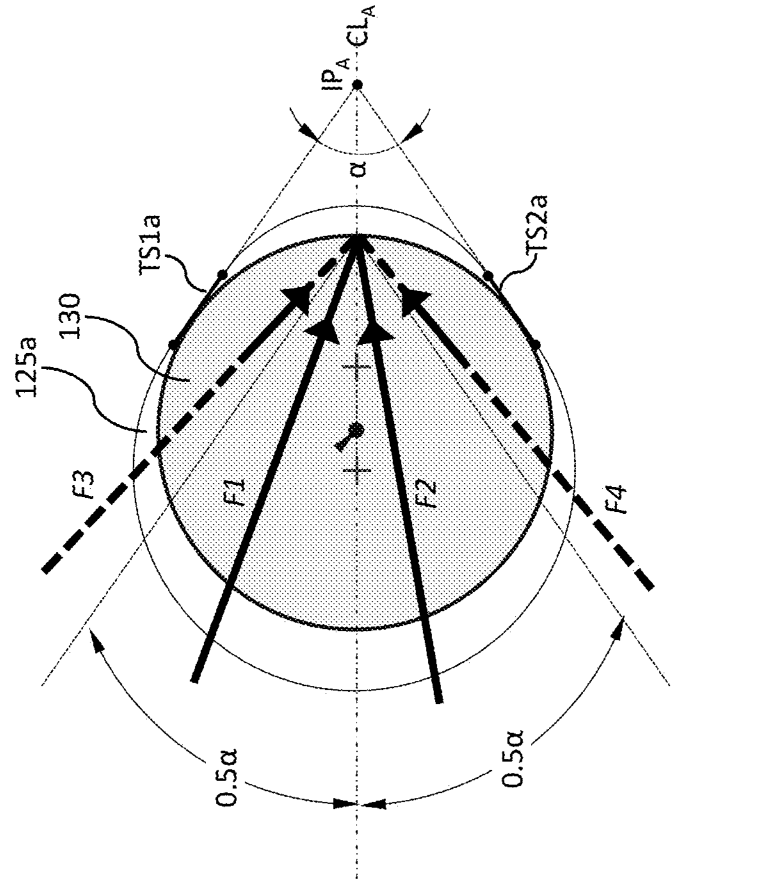
FIG. 3B shows various force vectors exerted against the hinge pin.
Figure 3C:
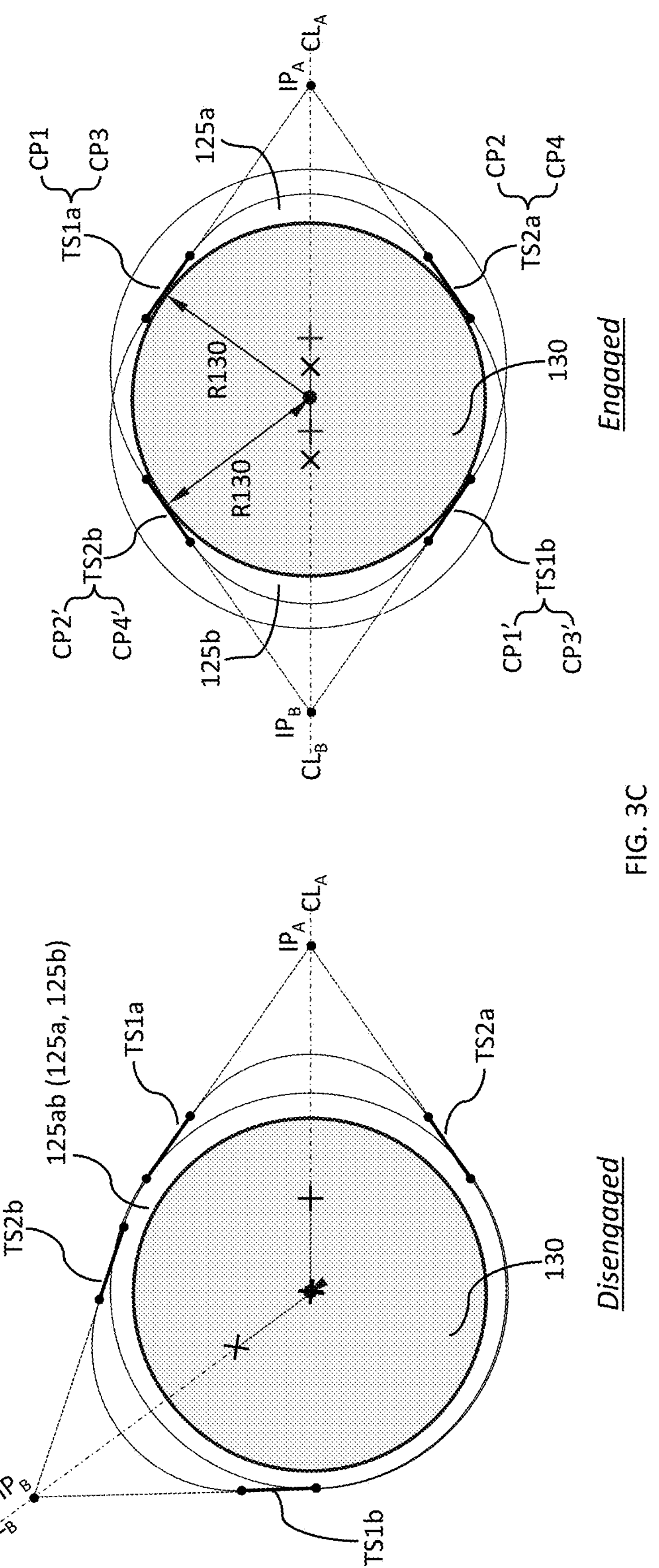
FIG. 3C shows disengaged and engaged configurations of the hinge pin arranged within asymmetric pin holes of two hinge leaves of the kinematic hinge.

As shown in FIG. 3B, (nesting) forces exerted onto the hinge pin (130) may be categorized as those represented by vectors/directions (e.g., F1 and F2) that intersect the centerline, $CL_A$, of the pin hole (e.g., 125a) at angles that are smaller than half the V-angle, or in other words, smaller than half the intersect angle, α, and those represented by vectors/directions (e.g., F3 and F4) that intersect the centerline, $CL_A$, of the pin hole (e.g., 125a) at angles that are greater than half the V-angle, or in other words, greater than half the intersect angle, α. In other words, and as shown in FIG. 3B, those force vectors (e.g., F1 and F2) that are contained within the V-shape and those force vectors (e.g., F3 and F4) that are not contained within the V-shape. It is noted that the V-shape considered in the context of forces exerted onto the hinge pin (130) may include a tip (e.g., vertex) that, as shown in FIG. 3B, is located within the hinge pin (130).

With continued reference to FIG. 3B, in order for a force vector exerted onto the hinge pin (130) to push the hinge pin (130) into the engaged state, the force vector should intersect the centerline, $CL_A$, of the pin hole (e.g., 125a) at an angle that is smaller than half the V-angle, or in other words, smaller than 0.5α. Accordingly, the force vectors F1 and F2 may push the hinge pin (130) into the engaged state, whereas the force vectors F3 and F4 may not push the hinge pin (130) into the engaged state. In other words, for a force vector exerted onto the hinge pin (130) to push the hinge pin (130) into the engaged state, the force vector should be encompassed within a region bounded by the V-shape and including the centerline, $CL_A$, of the pin hole (e.g., 125a).

FIG. 3C shows disengaged and engaged configurations/states of the hinge pin (130) arranged within asymmetric pin holes, (125a) and (125b) of the two hinge leaves (e.g., 110a, 110b of FIG. 1A) of the kinematic hinge (100). As shown, in the disengaged state, the hinge pin (130) is free to move within a common region (125ab) of the asymmetric pin holes (125a) and (125b) as enabled/facilitated by respective radii (e.g., R2 of FIG. 3A) of respective larger circles (e.g., R2, C2 of FIG. 3A) that are greater than the radius, R130, of the hinge pin (130). Accordingly, in the disengaged state, the (centerline CL of the) hinge pin (130) may be located at respective regions of the asymmetric pin holes (125*a*) and (125*b*) that are distal (away from) the respective intersection points, $IP_A$ and $IP_B$. Accordingly, in the disengaged state, the hinge pin (130) may not contact respective line segments, (TS1*a*, TS2*a*) and/or (TS1*b*, TS2*b*), of the of the asymmetric pin holes (125*a*) and (125*b*).

As shown in the engaged configuration of FIG. 3C, the hinge pin (130) is (completely) constrained, and therefore not free, to move further in respective directions of the intersection points, $IP_A$ and $IP_B$. Such constraint in movement is due to the direct physical interaction of the hinge pin (130) with the contact surfaces provided by the line segments, (TS1*a*, TS2*a*) and (TS1*b*, TS2*b*) as enabled/facilitated by respective radii (e.g., R1 of FIG. 3A) of respective smaller circles (e.g., R1, C1 of FIG. 3A) that are smaller than the radius, R130, of the hinge pin (130). Accordingly, in the engaged state, the (centerline CL of the) hinge pin (130) may be located at respective regions of the asymmetric pin holes (125*a*) and (125*b*) that are proximal (near to) the respective intersection point, $IP_A$ and $IP_B$. Accordingly, and as shown in FIG. 3C, in the engaged state, the hinge pin (130) may contact the line segments, (TS1*a*, TS2*a*) and (TS1*b*, TS2*b*), at respective contact points (CP1 and CP2, or CP3 and CP4) and (CP1' and CP2', or CP3' and CP4') that are exactly at a distance equal to the radius, R130, from the centerline, CL, of the hinge pin (130). In other words, in the engaged state, the (straight) line segments, (TS1*a*, TS2*a*) and (TS1*b*, TS2*b*), may be tangents to, or tangentially contact, the circular surface of the hinge pin (130), thereby defining single points of contacts (e.g., CP1-CP4 and CP1'-CP4'). According to an embodiment of the present disclosure, the points of contact, CP1-CP4, associated to the hinge leaf (110*a*) may be diametrically opposite to respective points of contact, CP1'-CP4', associated to the hinge leaf (110*b*), and accordingly, respective (nesting) force vectors exerted onto the hinge pin (130) through the points of contact, CP1-CP4, are also exerted onto the hinge pin (130) through the points of contact, CP1'-CP4'.

It is noted that in the engaged state, a relative position of the two centerlines, $CL_A$ and $CL_B$, may be zero degrees (e.g. 180 degrees, colinear), as shown in FIG. 3C, or generally, at any angle that is smaller than half the V-angle, or in other words, smaller than 0.5α. Such condition between the relative position of the two centerlines, $CL_A$ and $CL_B$, may guarantee existence of a common region where force vectors can push the hinge pin (130) into the engaged state. Suh common region may therefore include In other words, and with reference to the above description with reference to FIG. 3B, the V-shapes associated to the pin holes, (125*a*) and (125*b*), should intersect to provide said common region.

It is noted that although not shown in FIG. 3C, it is understood that engaging of the hinge pin (130) against contact surfaces (e.g., TS1*a*, TS1*b*, TS2*a*, TS2*b*) provided by each of the asymmetric pin holes (125*a*, 125*b*) is based on a condition imposed by respective force vectors as described above with reference to FIG. 3B. In particular, a requirement for the force vectors to be encompassed within regions bounded by the respective V-shapes of the asymmetric pin holes (125A) and (125*b*) may be maintained. It is further noted, that because there may be a number of constraints that may affect a practical realization of force vectors (e.g., directions thereof), such as for example, a constraint on a load placed upon the kinematic hinge (e.g., 100 of FIG. 1A), then the asymmetric pin holes (125*a*) and (125*b*) may be designed to comply to such constraints by way of, for example, a greater V-angle. In other words, and according to an embodiment of the present disclosure, the V-angle described above with reference to FIG. 3B may be adjusted (e.g., made smaller or greater) based on expected force vectors, such as, for example, force vectors inherent to a load placed upon the kinematic hinge.

Figure 4:
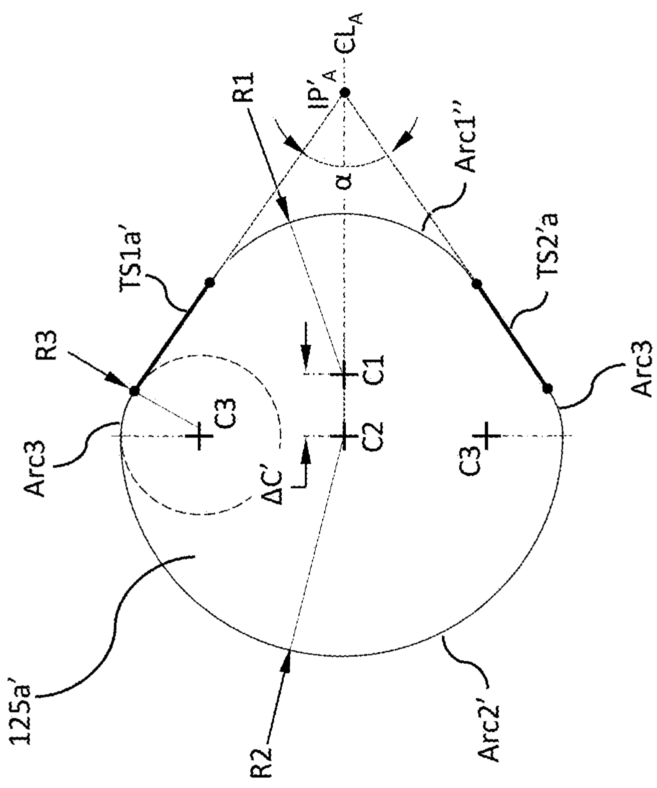
FIG. 4 shows two exemplary tear drop shapes of the asymmetric pin hole according to the present disclosure.
Figure 4:
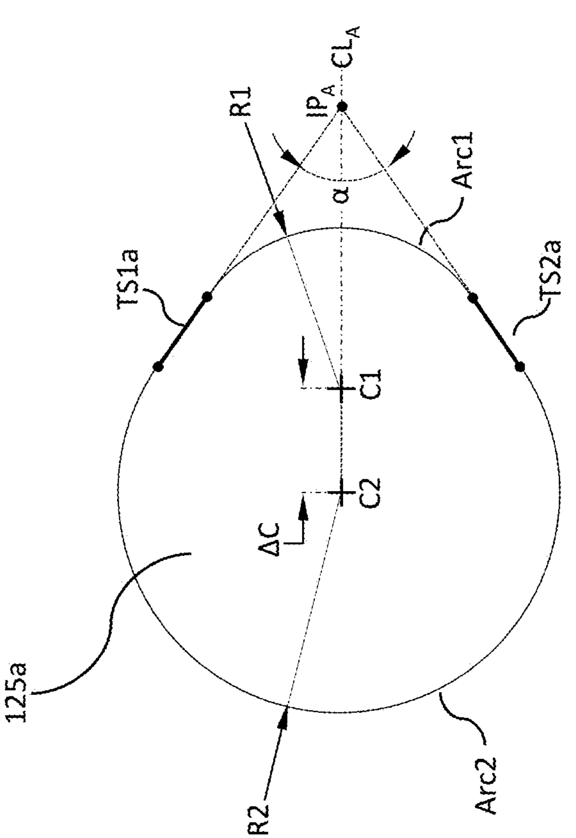
Figure 4:

Because, for a given diameter (e.g., R130) of the hinge pin (130), a size of the asymmetric pin holes (e.g., 125*a*, 125*b*) may be based on the (desired) V-angle, then it may be desirable to have an asymmetric pin hole that can provide a greater V-angle for a smaller overall size. It follows that, as shown in FIG. 4, teachings according to the present disclosure provide for an asymmetric pin hole (e.g., 125*a'*) that, for a given V-angle, is smaller compared to the asymmetric pin hole (e.g., 125*a*) described above with reference to FIG. 2B and FIG. 3A. The asymmetric pin hole (e.g., 125*a'*) can accordingly provide an overall smaller size of the kinematic hinge (e.g., 100 of FIG. 1A) while providing same functionality as the asymmetric pin hole (125*a*).

With further reference to FIG. 4, the asymmetric pin hole (125*a'*) includes common design parameters to the asymmetric pin hole (125*a*), including the larger circle (R2, C2), the smaller circle (R1, C1), and straight line segments (e.g., TS1*a'*, TS2*a'*) whose (geometrical) extensions provide a V-shape having the V-angle (i.e., intersect angle α). However, and differently from the asymmetric pin hole (125*a*), a shape of the asymmetric pin hole (125*a'*) is further based on a third circle (R3, C3) to provide an additional arc, Arc3. As shown in FIG. 4, the arc, Arc3, provided by the third circle (R3, C3) may join the arc, Arc2', provided by the larger circle (R2, C2) to the straight line segment, TS1*a'* or TS2*a'*. According to an embodiment of the present disclosure, a contact between the Arc2' and the Arc3, shown in FIG. 4 by an intersection of a dotted line originating from the center C3 with the two arcs, may be at a distance from the center C3 that is equal to the radius R3, such that the two arcs, Arc2' and Arc3, tangentially contact. According to an embodiment of the present disclosure, the straight line segment, TS1*a'* or TS2*a'*, may tangentially contact the arc, Arc3.

With continued reference to FIG. 4, according to an embodiment of the present disclosure, the radius R3 of the third circle (R3, C3) may be smaller than the radius R2 of the larger circle (R2, C2), and accordingly, the additional arc, Arc3, can provide a more pronounced (i.e., greater radius of) curvature for contacting the line segments (e.g., TS1*a'*, TS2*a'*). Accordingly, for a same radius, R1, of the smaller circle (R1, C1), the distance, ΔC', between the two centers, C1 and C2, of the asymmetric pin hole (125*a'*) may be made smaller compared to the distance, ΔC, between the two centers, C1 and C2, of the asymmetric pin hole (125*a*). In other words, the inclusion of the additional arc, Arc3, can reduce a length of the asymmetric pin hole (125') along the centerline, $CL_A$. According to an embodiment of the present disclosure, the radius R3 may be smaller than the radius R1. According to another embodiment of the present disclosure, the radius R3 may be smaller than the radius R2 and equal to or greater than the radius R1. Choice of the radius R3 may be considered a design parameter and based on design goals and constraints.

The asymmetric pin holes (125*a*) and (125*a'*) shown in FIG. 4 may be considered as having a teardrop shape, or an eccentric teardrop shape, with eccentricity provided by circles of different radii (e.g., R1, R2 or R3) whose centers (e.g., C1, C2 or C3) are arranged at offsets (e.g., ΔC or ΔC'). It is noted that although such teardrop shape may include advantages, such as simplicity in design and ease of manufacturing, it should however not be considered as limiting the scope of the present teachings. As described above in the present disclosure, a principle of operation of the kinematic hinge (e.g., 100) according to the present disclosure may be based on the presence of a hinge pin hole having a V-shape, and therefore a corresponding V-angle, that comply to force vectors exerted onto the hinge pin (130) and constrain movement of the hinge pin (130) in one direction.

Figure 5A:
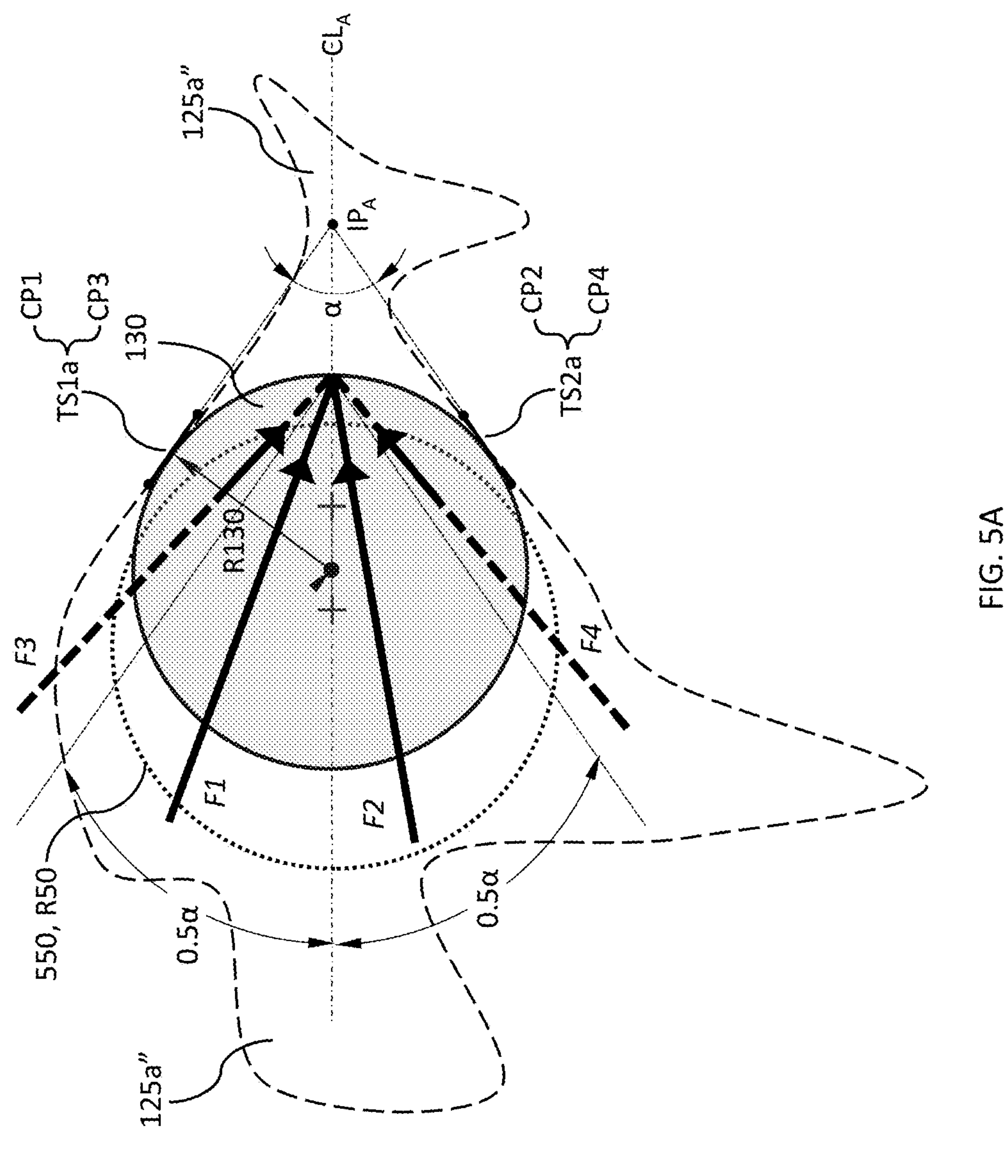
FIG. 5A shows an exemplary generic shape of the asymmetric pin hole according to the present disclosure.

Accordingly, and as shown in FIG. 5A, the asymmetric pin hole (e.g., 125") according to the present disclosure may include a (generic) shape that includes a pair of opposing and distant/separated straight line segments, TS1$a$ and TS2$a$, whose geometrical extensions intersect at an intersection point, $IP_A$, to form an intersect angle, α, or in other words, a V-angle of the V-shape. Such V-shape (e.g., the intersect angle, α) may be designed in view of the radius, R130, of the hinge pin (130) and such that the two straight lines, TS1$a$ and TS2$a$, are tangents (e.g., tangentially contact) to the hinge pin (130) in the engaged state. Similarly to the above description with reference to FIG. 3B, in order for a force vector exerted onto the hinge pin (130) to push the hinge pin (130) into the engaged state, the force vector should intersect the centerline, $CL_A$, of the pin hole (125$a$") at an angle that is smaller than half the V-angle, or in other words, smaller than half 0.5α. Accordingly, the force vectors F1 and F2 shown in FIG. 5A may push the hinge pin (130) into the (shown) engaged state, whereas the force vectors F3 and F4 may not push the hinge pin (130) into the engaged state.

Furthermore, in the engaged state shown in FIG. 5A, points of contact (e.g., CP1 and CP2, or CP3 and CP4) provided of the respective two straight lines, TS1$a$ and TS2$a$, may contact the hinge pin (130) at locations that are not diametrically opposite with respect to the centerline, CL, of the hinge pin (130), so to constrain movement of the hinge pin (130) in the direction of the intersection point, $IP_A$. Furthermore, as shown in FIG. 5A, the asymmetric pin hole (125") includes a region that allows the hinge pin (130) to move freely when in the disengaged state, such region defined as including a moving space (550) having a radius, R50, that is larger than a radius, R130, of the hinge pin (130). Other aspects of the asymmetric pin hole (125") shown in FIG. 5A may be taken from the totality of the above description.

The asymmetric pin hole according to the present disclosure (e.g., 125$a$, 125$a'$, 125$a''$) may be considered as including a radial asymmetry about the centerline, CL, of the hinge pin (130) that is arranged through the pin hole. In other words, as used in the present disclosure, an asymmetric pin hole may refer to a pin hole having a shape that is not circular or cylindrical.

The asymmetric pin hole according to the present disclosure may, or may not, include a symmetry along a line/axis that is orthogonal to the centerline, CL, of the hinge pin (130). For example, the asymmetric pin holes (125$a$) and (125$a'$) shown in FIG. 4 may include such symmetry about the centerline, $CL_A$. On the other hand, the asymmetric pin hole (125$a''$) shown in FIG. 5A may not be considered as including a symmetry along any axis that is orthogonal to the centerline, CL, of the hinge pin (130), including the centerline, $CL_A$. In other words, teachings according to the present disclosure may include an asymmetric pin hole that includes or excludes an axis of symmetry in the plane that defines the shape of the pin hole, or in other words, in the plane of the rendered figures (e.g., FIGS. 2B, 3, 4, 5A) of the present application that corresponds to a plane that is orthogonal to the centerline, CL, of the hinge pin (130, e.g., plane of the hinge pin).

Figure 5B:
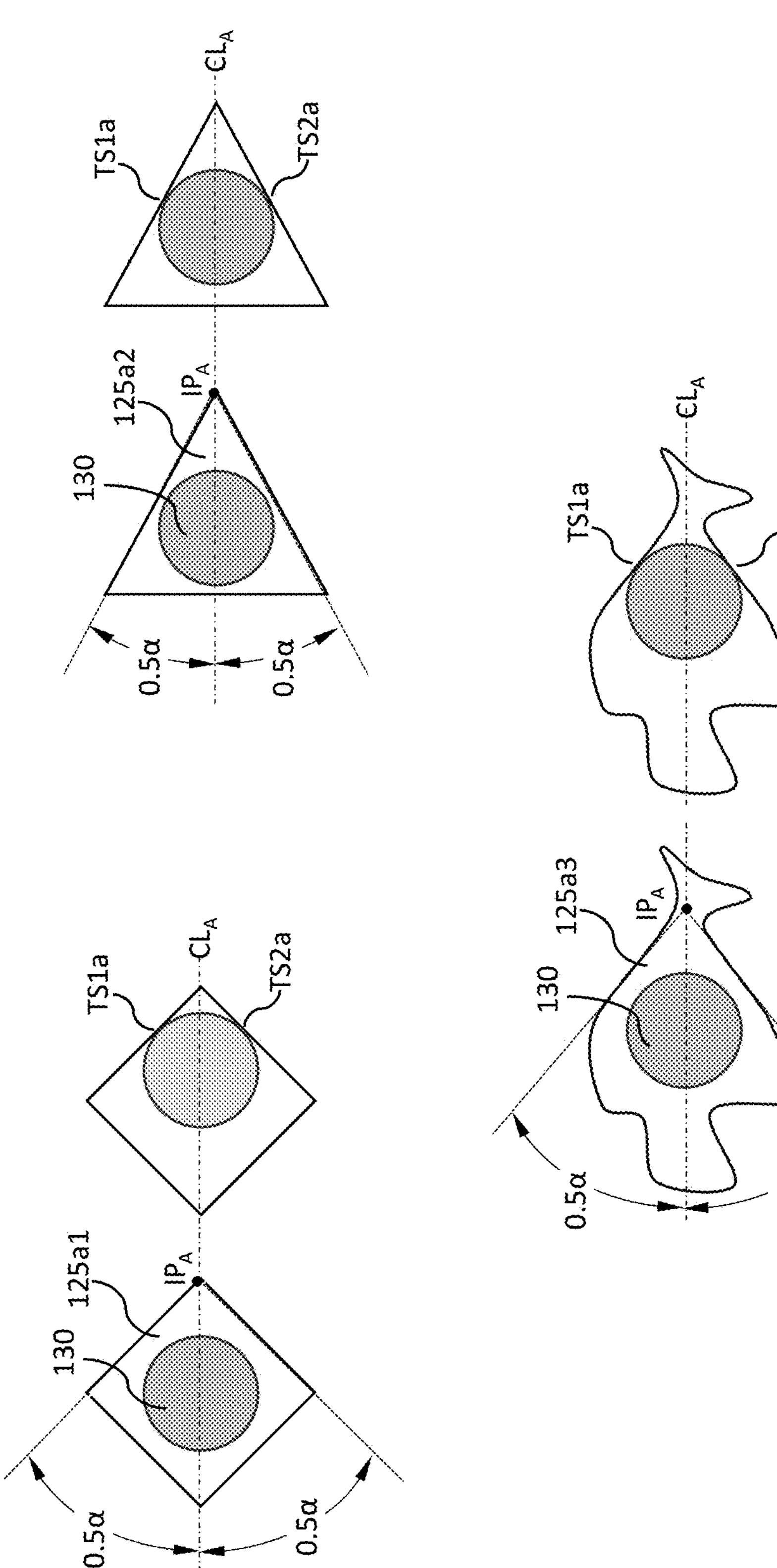
FIG. 5B shows disengaged and engaged configurations of the hinge pin for other exemplary shapes of a pin hole.

FIG. 5B shows disengaged and engaged configurations of the hinge pin (130) for other exemplary shapes of the asymmetric pin hole according to the present disclosure. These include, for example, asymmetric pin holes (125$a$1) and (125$a$2) with respective square and triangular shapes that accordingly contain a symmetry about a respective centerline, $CL_A$, and asymmetric pin hole (125$a$3) having a random shape (e.g., similar to FIG. 5A) that does not contain any symmetry in the plane of the hinge pin (130).

As described above in the present disclosure, the asymmetric pin hole according to the present disclosure may include a V-shape that is symmetrical with respect to a centerline (e.g., $CL_A$ or $CL_B$ of FIG. 4) of the pin hole. In other words, and as shown in the exemplary embodiments of the asymmetric pin holes (125$a$, 125$a'$, 125$a''$, 125$a$1, 125$a$2, 125$a$3) of FIG. 4, FIG. 5A and FIG. 5B, the geometrical extension of each of the line segments, TS1$a$ and TS2$a$, may intersect at the intersection point, $IP_A$, to form an angle with respect to the centerline (e.g., $CL_A$ or $CL_B$) that is half the intersect angle, α (e.g., V-angle). Furthermore, in the exemplary embodiments of the asymmetric pin holes (125$a$, 125$a'$, 125$a$1, 125$a$2), the centerline (e.g., $CL_A$) may also represent (e.g., coincide with) an axis of symmetry of the shape of the pin hole in the plane of the hinge pin (130).

According to an embodiment of the present disclosure, the centerline (e.g., $CL_A$ or $CL_B$) of the asymmetric pin hole may be included in, or parallel to, a plane of the respective hinge leaf (e.g., 110$a$, 110$b$ of FIG. 1A). In other words, and with reference back to the bottom and side views of kinematic hinge (100) shown in FIG. 1B, the centerline (e.g., $CL_A$ or $CL_B$) of the respective pin holes, (125$a$) and (125$b$), may be parallel to the (major) surfaces of the respective hinge leaves, (110$a$) and (110$b$). Accordingly, an orientation of the V-shape provided by the respective pin hole, (125$a$) or (125$b$), may be such that the two line segments (e.g., TS1$a$ and TS2$a$, or TS1$b$ and TS2$b$) that define the V-shape may intersect a plane (now represented by the respective centerline $CL_A$ or $CL_B$) parallel to a (major) surface of the respective hinge leaf, (110$a$) or (110$b$), at an angle that is half the V-angle (e.g., 0.5α).

Figure 5C:
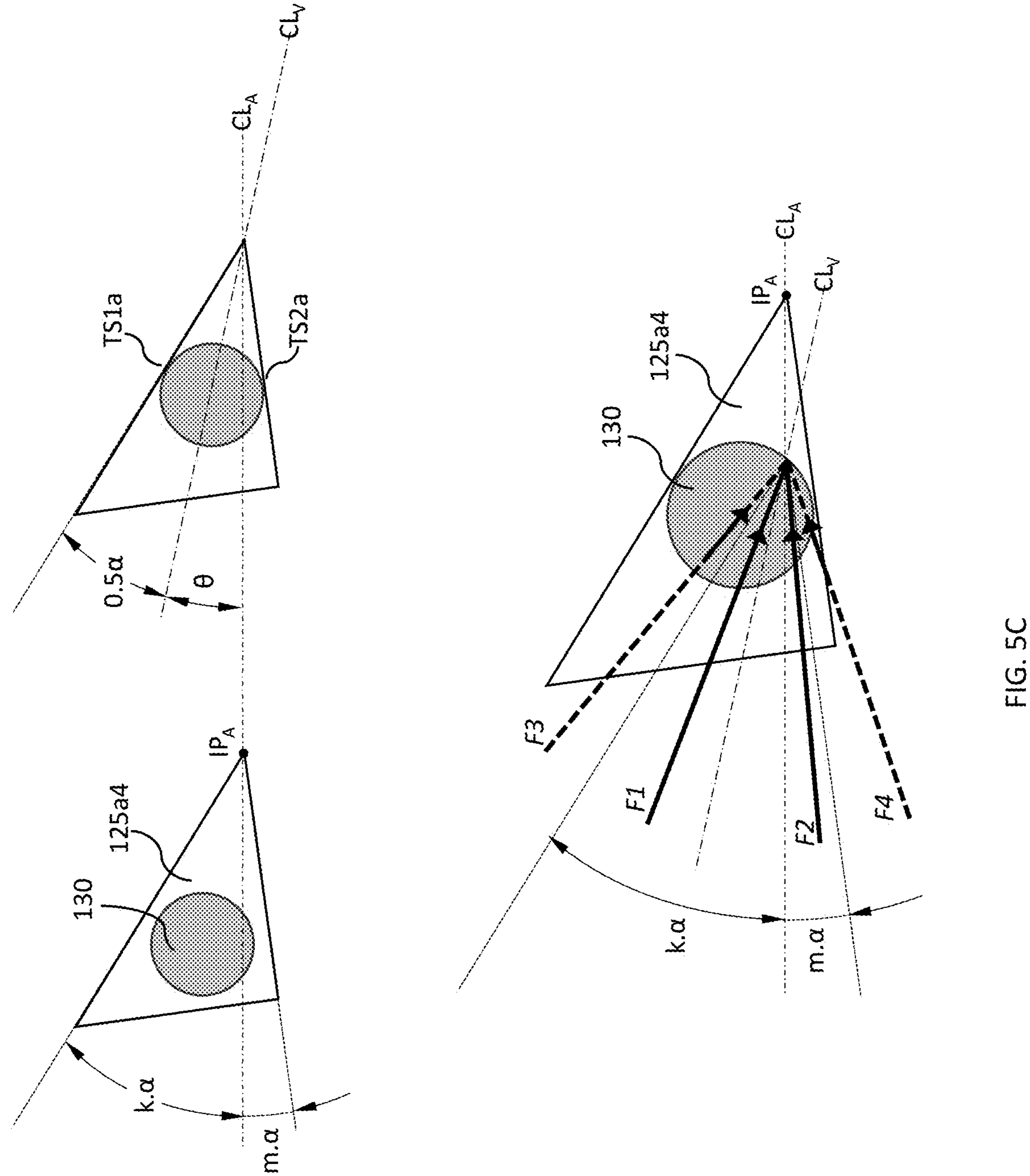
FIG. 5C shows disengaged and engaged configurations of the hinge pin and various force vectors exerted against the hinge pin for another exemplary shape of the asymmetric pin hole.

According to an embodiment of the present disclosure, the centerline of the V-shape provided by the asymmetric pin hole may intersect, or not be parallel to, the plane of the respective hinge leaf (e.g., 110$a$, 110$b$ of FIG. 1A). In other words, and as shown in FIG. 5C, the orientation of the V-shape provided by the respective pin hole (e.g., 125$a$4) may be such that the two line segments (e.g., TS1$a$ and TS2$a$) that define the V-shape may intersect a plane parallel to a (major) surface of the respective hinge leaf, (110$a$) or (110$b$), at an angle that is different from half the V-angle (e.g., 0.5α). In FIG. 5C, the centerline, $CL_A$, is assumed parallel to the (major) surface of the respective hinge leaf (e.g., 110$a$), and the line segments, TS1$a$ and TS2$a$, are shown intersecting the centerline, $CL_A$, at respective angles, $k.\alpha$ and $m.\alpha$, with $k \neq 1$ and $m \neq 1$. Furthermore, as shown in FIG. 5C, an orientation of the V-shape provided by the respective pin hole (e.g., 125$a$4) may be defined according to an offset angle, θ, between the centerline, $CL_A$, and a (true, effective) centerline of the V-shape, $CL_V$.

With further reference to FIG. 5C, and similarly to the above description with reference to FIG. 3B and FIG. 5A, in order for a force vector exerted onto the hinge pin (130) to push the hinge pin (130) into the engaged state, the force vector should be encompassed within a region bounded by the V-shape and including the centerline, $CL_A$, of the pin hole (125$a$4). In other words, for the case shown in FIG. 5C, in order for a force vector exerted onto the hinge pin (130)

to push the hinge pin (130) into the engaged state, the force vector should intersect the centerline, $CL_A$, of the pin hole (125a4) at an angle that is either smaller k.α (e.g., F1, when the force is exerted from above the centerline $CL_A$) or smaller than m.α (e.g., F2, when the force is exerted from below the centerline $CL_A$). It is noted that if considering the centerline of the V-shape, $CL_V$, then in order for a force vector exerted onto the hinge pin (130) to push the hinge pin (130) into the engaged state, the force vector should intersect the centerline, $CL_V$, of the V-shape at an angle that is smaller than half the V-angle, or in other words, smaller than half 0.5α. Accordingly, the force vectors F1 and F2 shown in FIG. 5C may push the hinge pin (130) into the (shown) engaged state, whereas the force vectors F3 and F4 may not push the hinge pin (130) into the engaged state.

Figure 6A:
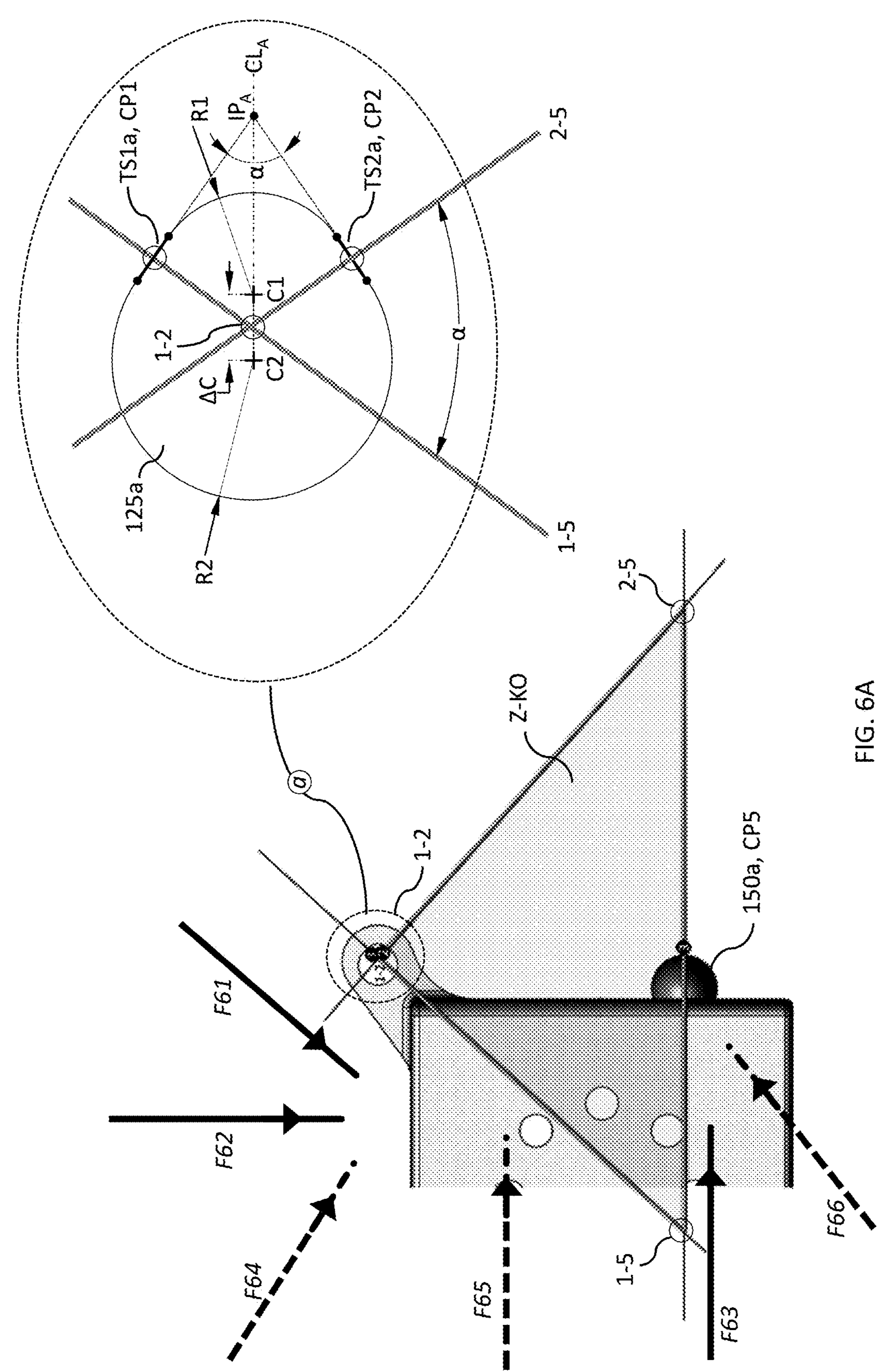
FIG. 6A shows a keep-out zone for forces exerted on the kinematic hinge of FIG. 1A.

FIG. 6A shows a keep-out zone, Z-KO, for (nesting) forces exerted on the kinematic hinge (100) of FIG. 1A. In other words, the keep-out zone, Z-KO, may represent a region through which no (nesting) force vectors should be exerted in order to maintain a kinematic coupling of the hinge (100). In particular, any force vector that is exerted onto the hinge (100) through the keep-out zone, Z-KO, may cause the (kinematic) contact points (e.g., CP1-CP6) provided by the (kinematic) hinge (100) to push away from one another (e.g., from respective contact surfaces) resulting in positional errors/shifts. For example, force vectors, F64, F65, and F66, are shown to pierce the keep-out zone, Z-KO, on their way to push away any one or more of the contact points, CP1, CP2, and/or CP5. On the other hand, force vectors, F61, F62, and F63, are shown not to pierce the keep-out zone, Z-KO, and therefore may not influence the kinematic nature of the contact points, CP1, CP2, and CP5. It is noted that an equivalent (e.g., same shape) keep-out zone may be established for the contact points, CP3, CP4, and CP6, that are located, as shown in FIG. 2A, at opposite end of the hinge pin (130).

With continued reference to FIG. 6A, the keep-out zone, Z-KO, associated to the contact points, CP1, CP2 and CP5, may be represented (e.g., in a two-dimensional space) by a triangle whose vertices are formed by lines that are normal to the respective contact surfaces. For example, vertex, 1-5, may be associated to the intersection of lines normal to the contact surfaces of CP1 (e.g., TS1a as shown in the exploded detail) and CP5; vertex, 2-5, may be associated to the intersection of lines normal to the contact surfaces of CP2 (e.g., TS2a as shown in the exploded detail) and CP5; and vertex, 1-2, may be associated to the intersection of lines normal to the contact surfaces of CP1 and CP2.

Figure 6B:
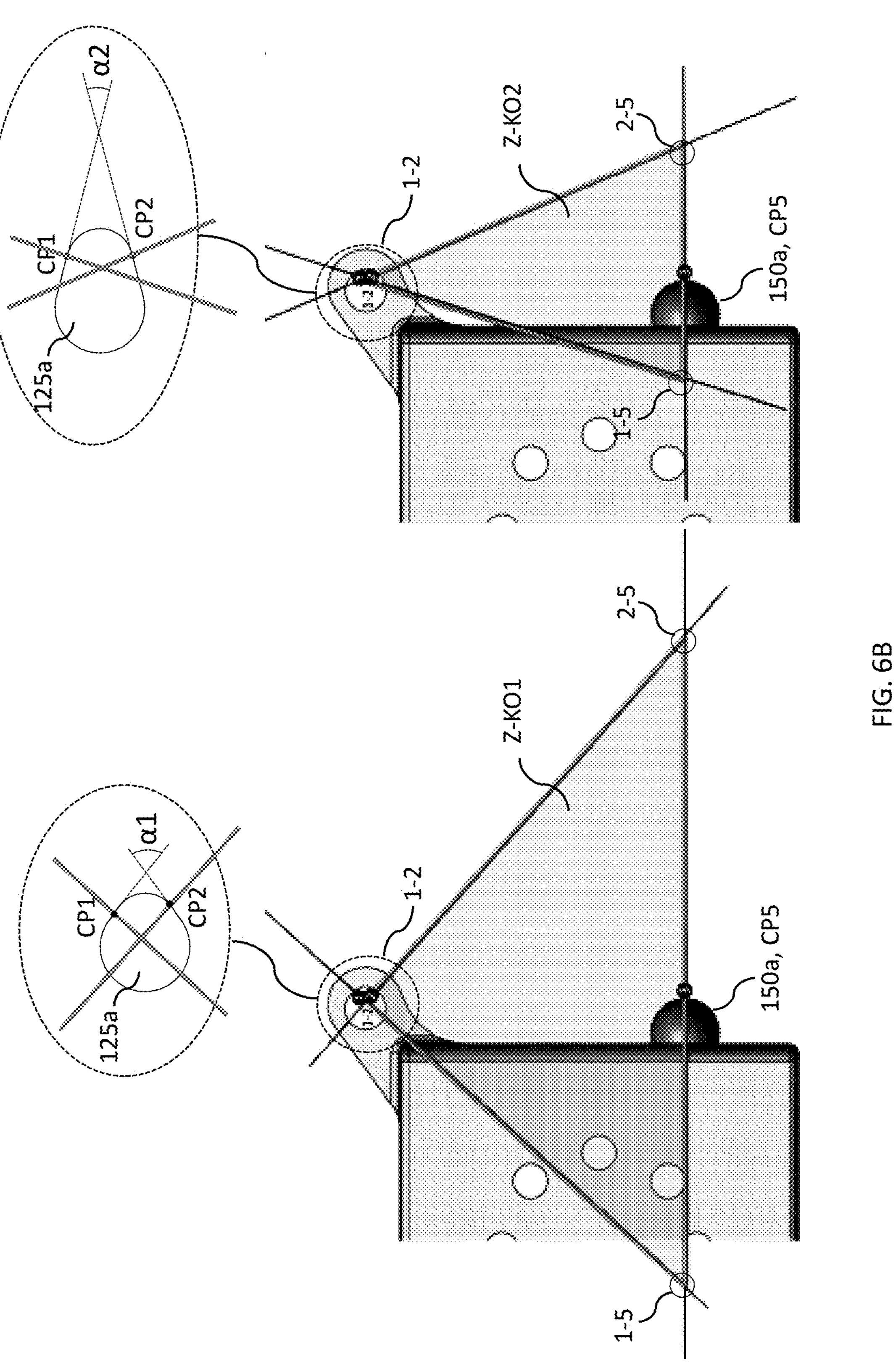
FIG. 6B shows methods and structures for reducing the keep-out zone shown in FIG. 6A.

As shown in the exploded detail of FIG. 6A, a size of the triangle representing the keep-out zone, Z-KO, may be related to the V-angle, α (e.g., the intersect angle). In particular, reducing the V-angle, will reduce the size of the triangle, and therefore of the keep-out zone, Z-KO. This is shown in FIG. 6B, where a keep-out zone, Z-KO2, associated to a pin hole having a smaller V-angle, α2, is smaller than a keep-out zone, Z-KO1, associated to a pin hole having a larger V-angle, α1.

Figure 7A:
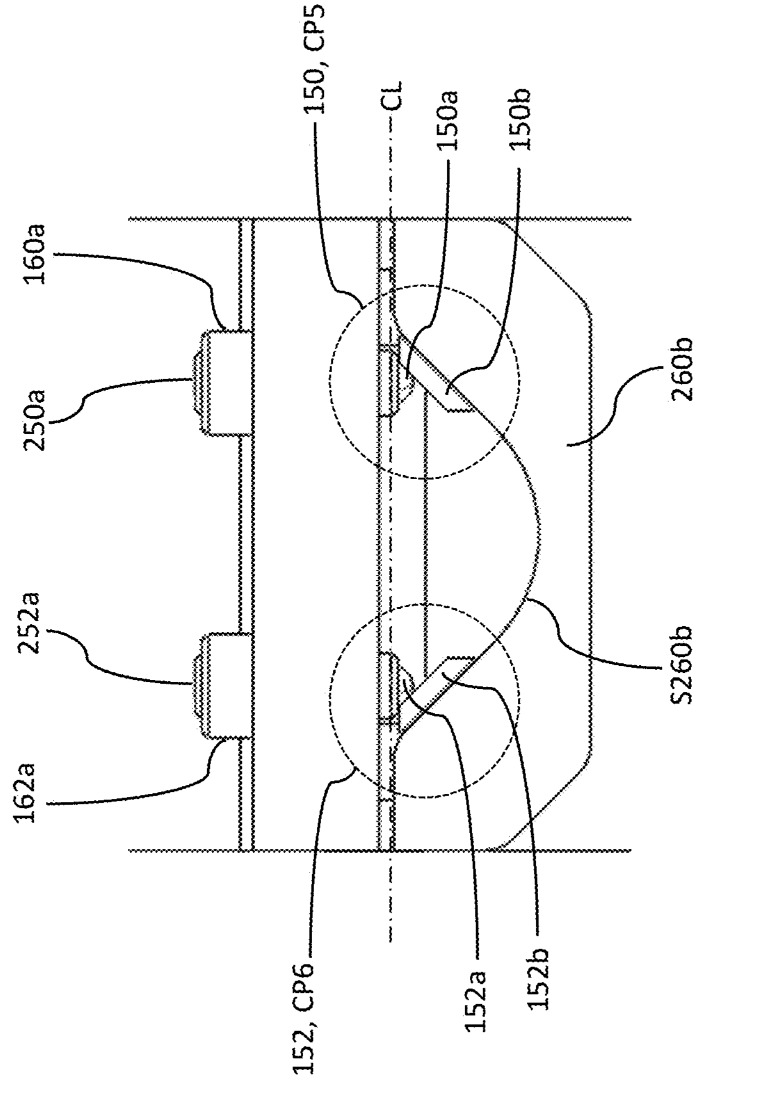
FIG. 7A shows a split V-block according to an embodiment of the present disclosure for provision of two points of contacts away from the hinge pin.

FIG. 7A shows a split V-block (e.g., 150, 152) according to an embodiment of the present disclosure for provision of the two points of contacts, CP5 and CP6, away from the hinge pin (130). Elements shown in FIG. 7A were previously described above with reference to, e.g., FIG. 1B, including the features (150) and (152) and elements (e.g., 150a, 150b, 152a, 152b) thereof. It is noted that the split V-block (150, 152) may be considered as providing a kinematic coupling between a groove and a ball, where both the groove and the ball are split. In other words, contact surfaces of the groove and of the ball are split/distanced/separated according to the features (150) and (152) to provide the two points of contact, CP5 and CP6. Accordingly, the split V-block (150, 152) can allow distancing the two points of contact, CP5 and CP6, along a direction of the centerline, CL, of the hinge pin (130), in other words, along a width of the hinge leaf (e.g., 110a, 110b). It is noted that the two points of contact, CP5 and CP6, are contained in a plane that may be regarded as a plane of contact of the two hinge leaves (110a) and (110b), such plane of contact intersecting respective (surface) planes of the two hinge leaves (110a) and (110b). It is further noted that a V-shape provided by the split V-block is contained in a plane that intersects a plane that contains the V-shape provided by the asymmetric pin hole (e.g., 125a, 125b) in the engaged state.

Figure 7B:
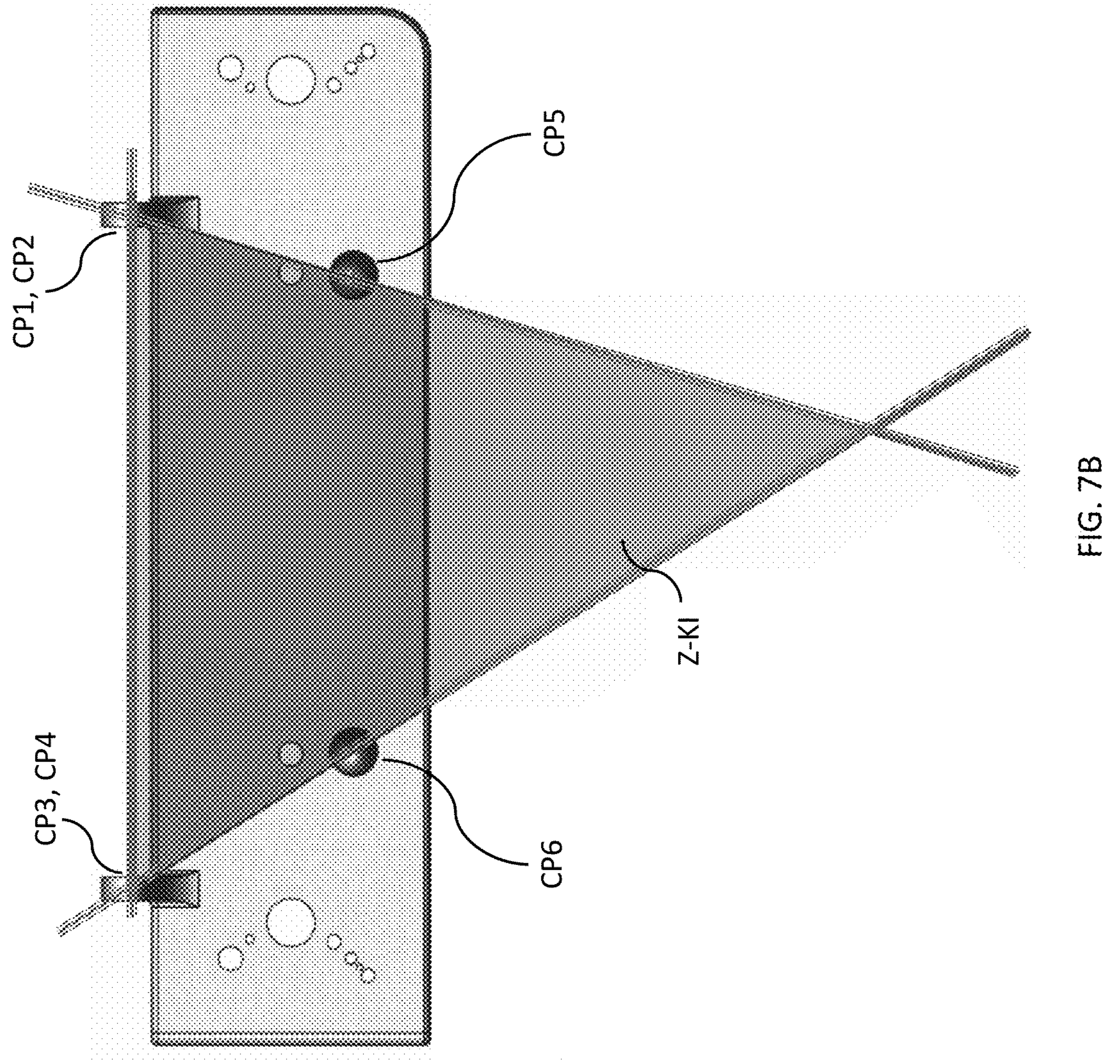
FIG. 7B shows a keep-in zone for forces exerted on the kinematic hinge with the split V-block of FIG. 7A.
Figure 7C:
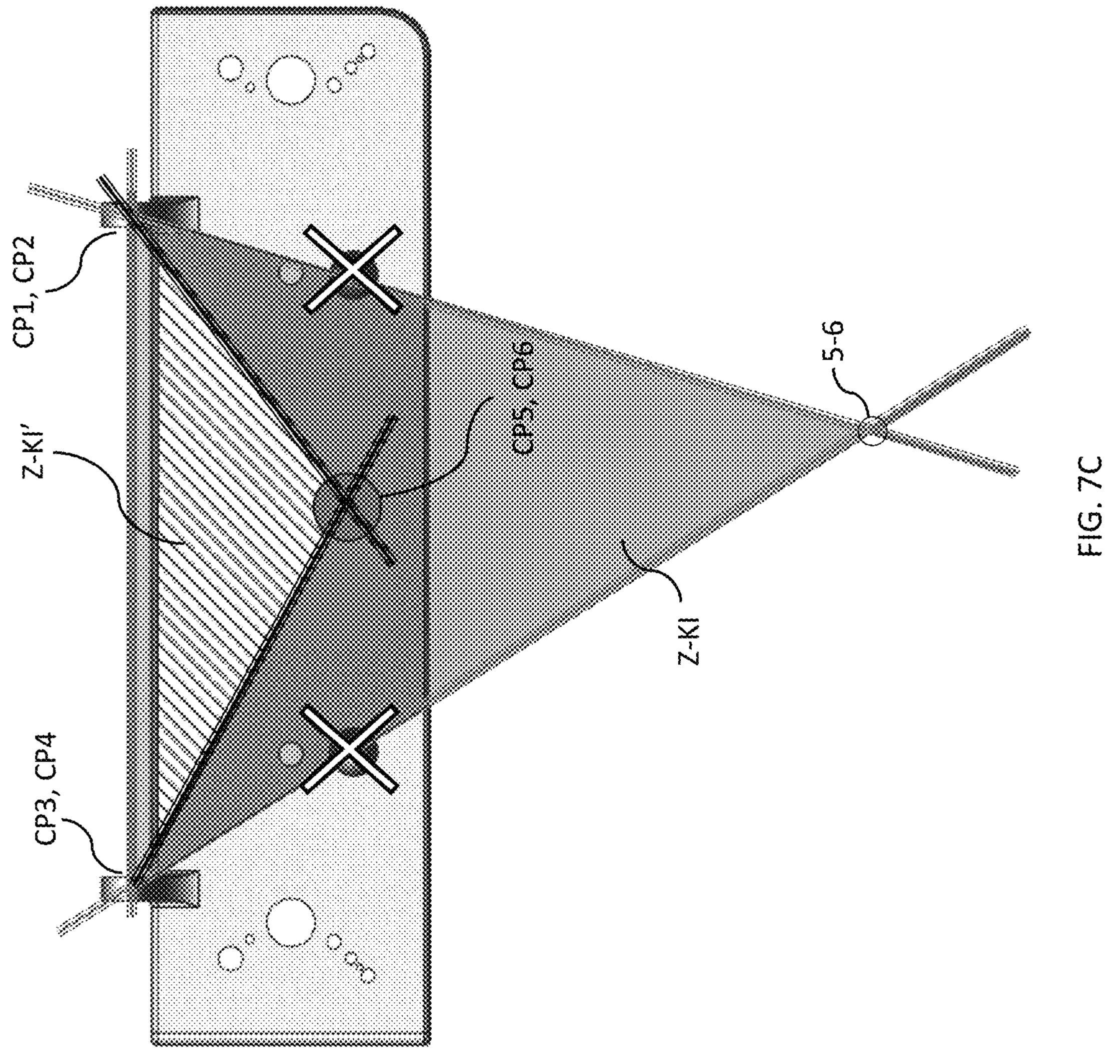
FIG. 7C contrasts keep-in zones for forces exerted on the kinematic hinge for a case of the split V-block of FIG. 7A and a case of a traditional unified V-block.

FIG. 7B shows a keep-in zone, Z-KI, for (nesting) forces exerted on the kinematic hinge (100) with the split V-block (e.g., 150, 152) of FIG. 7A. In other words, the keep-in zone, Z-KI, may represent a region through which (nesting) force vectors should be exerted in order to maintain a kinematic coupling of the hinge (100). In particular, only force vectors exerted onto the hinge (100) through the keep-in zone, Z-KI, may cause the contact points (e.g., CP1-CP6) provided by the hinge (100) to be kinematic. As shown in FIG. 7B, the keep-in zone, Z-KI, may be represented by a triangle whose vertices are formed by lines passing through the contact points, CP1-CP6. As shown in FIG. 7C, when compared to a keep-in zone, Z-KI', of a traditional (non-split) V-block configuration, the keep-in zone, Z-KI, of the split V-block according to the present teachings can be larger. By expanding (e.g., via distancing of the two contact pints CP5 and CP6) the region through which the nesting forces for providing a kinematic coupling may be exerted, the kinematic hinge (e.g., 100) with the split V-block (e.g., 150, 152) according to the present teachings may allow for increased flexibility in use. Because there may be a number of constraints that may affect a practical realization of force vectors (e.g., directions thereof), such as for example, a constraint on a load placed upon the kinematic hinge (e.g., 100 of FIG. 1A), then the V-block (150, 152) may be designed for a keep-in zone, Z-KI, to comply to such constraints by way of, for example, a greater distance between the two features (150) and (152). It is noted that distancing of the two contact points, CP5 and CP6, may place such contact points within a longitudinal segment defined/bounded by the positions of the contact points, CP1-CP4, as shown in, e.g., FIG. 7B, and therefore, result in a triangular (e.g., convergent, closed) shape of the associated keep-in zone, Z-KI. However, such placement of the contact points, CP5 and CP6, may not be considered as limiting the scope of the present disclosure, as the contact points, CP5 and CP6, may also be placed outside the longitudinal segment defined/bounded by the positions of the contact points, CP1-CP4. In such case, a larger (e.g., divergent, open) shape of the associated keep-in zone, Z-KI, can be obtained.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

The invention claimed is:

1. A kinematic hinge, comprising:

a first hinge leaf comprising a pin hole; and a hinge pin arranged through the pin hole, wherein the pin hole includes two flat contact surfaces oppositely arranged at a relative angle to form a V-shape, during a non-deployed state of the kinematic hinge, the hinge pin is free to move in the pin hole, and during a deployed state of the kinematic hinge, the hinge pin is engaged with the two flat contact surfaces by way of two kinematic contact points formed between a round surface of the hinge pin and the two flat contact surfaces.

2. The kinematic hinge of claim 1, wherein:

a centerline of the V-shape is included in a plane that is parallel to a plane of the first hinge leaf.

3. The kinematic hinge of claim 1, wherein:

a centerline of the V-shape is included in a plane that intersects a plane of the first hinge leaf.

4. The kinematic hinge of claim 1, wherein:

a shape of the pin hole includes a symmetry about a centerline of the V-shape.

5. The kinematic hinge of claim 1, wherein:

a shape of the pin hole includes a teardrop shape provided by a first curved surface of the pin hole having a first radius that is greater than a radius of the hinge pin, and a second curved surface of the pin hole having a second radius that is smaller than the radius of the hinge pin, and the two flat contact surfaces are arranged between the first and second curved surfaces.

6. The kinematic hinge of claim 5, wherein:

each of the two flat contact surfaces tangentially connect to the first and second curved surfaces.

7. The kinematic hinge of claim 5, wherein:

the teardrop shape is further provided by a third curved surface of the pin hole having a third radius that is smaller than the first radius, the third curved surface arranged between the first curved surface and a first one of the two flat contact surfaces, and an additional third curve surface of the pin hole having the third radius, the additional third curved surface arranged between the first curved surface and a second one of the two flat contact surfaces.

8. The kinematic hinge of claim 7, wherein:

the first one of the two flat contact surfaces tangentially connect to the second and third curved surfaces, and the second one of the two flat contact surfaces tangentially connect to the second and additional third curved surfaces.

9. The kinematic hinge of claim 8, wherein:

the third curved surface and the additional third curved surface tangentially connect to the first curved surface.

10. The kinematic hinge of claim 1, wherein:

the first hinge leaf further comprises an additional pin hole, the hinge pin is further arranged through the additional pin hole, the additional pin hole includes two additional flat contact surfaces oppositely arranged at a relative angle to form an additional V-shape, during the non-deployed state of the kinematic hinge, the hinge pin is free to move in the additional pin hole, and during a deployed state of the kinematic hinge, the hinge pin is further engaged with the two additional flat contact surfaces by way of two additional kinematic contact points formed between the round surface of the hinge pin and the two additional flat contact surfaces.

11. The kinematic hinge of claim 10, wherein:

during the deployed state of the kinematic hinge, the hinge pin is engaged with the two flat contact surfaces and the two additional flat contact surfaces through contact regions of the round surface of the hinge pin that are appositely arranged along a longitudinal extension of the hinge pin.

12. The kinematic hinge of claim 10, wherein:

the first hinge leaf further comprises a split V-block structure comprising a first V-block flat contact surface and a second V-block flat contact surface respectively arranged proximal the pin hole and the additional pin hole, and during the deployed state of the kinematic hinge, the first and second V-block flat contact surfaces are configured to contact respective first and second round contact surfaces by way of a respective one of two additional kinematic contact points.

13. The kinematic hinge of claim 12, wherein:

respective first and second normal to the first and second V-block flat contact surfaces intersect a centerline along a longitudinal extension of the hinge pin at respective first and second intersect angles.

14. The kinematic hinge of claim 12, further comprising:

a second hinge leaf comprising respective pin hole and additional pin hole, wherein the second hinge leaf further comprises the respective first and second contact surfaces of the two additional kinematic contact points.

15. The kinematic hinge of claim 14, wherein:

the respective first and second contact surfaces of the two additional kinematic contact points are provided via respective first and second ball-tipped set screws mounted onto the second hinge leaf.

16. A multi-panel deployable antenna assembly, comprising:

a kinematic hinge according to claim 14; and a plurality of antenna panels fixed onto the first and second hinge leaves of the kinematic hinge.

17. The kinematic hinge of claim 12, further comprising:

a second hinge leaf, wherein the hinge pin is rigidly attached to the second hinge leaf.

18. A multi-panel deployable antenna assembly, comprising:

a kinematic hinge according to claim 17; and a plurality of antenna panels fixed onto the first and second hinge leaves of the kinematic hinge.

19. The kinematic hinge of claim 12, wherein:

a distance between the first and second V-block flat contact surfaces determines a keep-in zone for force vectors exerted upon the kinematic hinge during the deployed state.

20. The kinematic hinge of claim 19, wherein:

a greater distance between the first and second V-block flat contact surfaces increases a size of the keep-in zone, and a smaller distance between the first and second V-block flat contact surfaces decreases the size of the keep-in zone.

21. The kinematic hinge of claim 1, wherein:

the relative angle of the V-shape formed by the two flat surfaces is based on expected force vectors exerted upon the kinematic hinge during the deployed state.

22. The kinematic hinge of claim 1, wherein:

the relative angle of the V-shape formed by the two flat surfaces determines a keep-out zone for force vectors exerted upon the kinematic hinge during the deployed state.

23. The kinematic hinge of claim 22, wherein:

a greater relative angle of the V-shape formed by the two flat surfaces increases a size of the keep-out zone, and a smaller angle of the V-shape formed by the two flat surfaces decreases the size of the keep-out zone.

* * * * *